(12) United States Patent
Witkowski et al.

(10) Patent No.: US 11,519,530 B2
(45) Date of Patent: Dec. 6, 2022

(54) FULL-ROOT-RADIUS-THREADED WING NUT HAVING INCREASED WALL THICKNESS

(71) Applicant: SPM Oil & Gas Inc., Fort Worth, TX (US)

(72) Inventors: Brian Witkowski, Weatherford, TX (US); Bunhap Sam, Fort Worth, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 16/673,961

(22) Filed: Nov. 5, 2019

(65) Prior Publication Data

US 2020/0063899 A1    Feb. 27, 2020

Related U.S. Application Data

(63) Continuation of application No. 15/182,192, filed on Jun. 14, 2016, now Pat. No. 10,557,576.
(Continued)

(51) Int. Cl.
*F16L 19/025*  (2006.01)
*E21B 17/04*  (2006.01)
*F16B 33/02*  (2006.01)

(52) U.S. Cl.
CPC ............ *F16L 19/025* (2013.01); *E21B 17/04* (2013.01); *F16B 33/02* (2013.01)

(58) Field of Classification Search
CPC ......... F16L 19/025; E21B 17/04; F16B 33/02
(Continued)

(56) References Cited

U.S. PATENT DOCUMENTS 345,420 A    7/1886   Eskholme et al.
375,464 A    12/1887  Thacher et al.
(Continued)

FOREIGN PATENT DOCUMENTS

AU    1320088 A    9/1988
AU    649744       6/1994
(Continued)

OTHER PUBLICATIONS

International Search Report issued re International Application No. PCT/US2016/037391 by ISA/US dated Sep. 9, 2016 (2 pages).
(Continued)

*Primary Examiner* — Zachary T Dragicevich

(57) ABSTRACT

According to one aspect, a hammer union includes a female sub; a male sub; and a wing nut that is concentrically disposed about the female and male subs. The wing nut includes a body having first and second end surfaces, and an exterior surface extending therebetween; a passage extending through the body from the first to second end surface that defines an interior surface of the body; an internal shoulder formed by the interior surface; an internal threaded connection that extends from the first end surface and towards the internal shoulder; and lugs extending radially from the exterior surface. In one aspect, the body has a wall thickness defined between the interior and exterior surfaces, with a greater wall thickness at the internal shoulder than at the first end surface; the internal threaded connection has a full-root radius; and a lug that extends along the axial length of the body.

20 Claims, 27 Drawing Sheets

Related U.S. Application Data

(60) Provisional application No. 62/286,079, filed on Jan. 22, 2016, provisional application No. 62/175,838, filed on Jun. 15, 2015.

(58) Field of Classification Search
USPC .......................... 285/354, 386, 388; 411/435
See application file for complete search history.

(56) References Cited

U.S. PATENT DOCUMENTS

| | | |
|---|---|---|
| 580,226 A | 4/1897 | Sanford |
| 741,477 A | 10/1903 | Flinn |
| 1,201,022 A | 10/1916 | Conniff |
| 1,379,092 A | 5/1921 | Fraccascia et al. |
| 1,452,603 A | 4/1923 | Himes |
| 1,473,634 A | 11/1923 | Loudon |
| 1,483,001 A | 2/1924 | Kurre |
| 1,488,211 A | 3/1924 | Loeffler |
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| D86,952 S | 5/1932 | Garrison |
| 1,880,638 A | 10/1932 | Wood |
| 1,889,256 A | 11/1932 | Lipscomb et al. |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| D150,466 S | 8/1948 | Schuler |
| 2,506,162 A | 5/1950 | Metzgar |
| 2,576,431 A | 11/1951 | White |
| 2,587,212 A | 2/1952 | Placette |
| 2,589,144 A | 3/1952 | Russell et al. |
| 2,606,068 A | 8/1952 | Bonacor |
| 2,612,340 A | 9/1952 | Laurent |
| 2,663,458 A | 12/1953 | Macglashan, Jr. |
| 2,694,503 A | 11/1954 | Young et al. |
| 2,717,001 A | 9/1955 | Perrault |
| 2,746,773 A | 5/1956 | Bily |
| 2,766,999 A | 10/1956 | Watts et al. |
| 2,795,459 A | 6/1957 | Cornelius |
| 2,923,317 A | 2/1960 | Mcinerney |
| 2,925,827 A | 2/1960 | Anderson et al. |
| 2,969,492 A | 1/1961 | Wheatley |
| 3,024,047 A | 3/1962 | Schmohl |
| 3,060,961 A | 10/1962 | Conley |
| 3,061,267 A | 10/1962 | Hamer |
| 3,064,940 A | 11/1962 | Anderson et al. |
| 3,072,379 A | 1/1963 | Hamer |
| 3,108,939 A | 10/1963 | Sabins |
| 3,113,792 A | 12/1963 | Brown |
| 3,150,681 A | 9/1964 | Hansen et al. |
| 3,160,426 A | 12/1964 | Faeser |
| 3,194,589 A | 7/1965 | Kahlbau et al. |
| 3,204,484 A | 9/1965 | Gustafson et al. |
| 3,216,746 A | 11/1965 | Watts |
| 3,228,334 A | 1/1966 | Oss |
| 3,238,687 A | 3/1966 | Tisbo |
| 3,241,567 A | 3/1966 | Pusch et al. |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain et al. |
| 3,404,698 A | 10/1968 | Rouse |
| 3,425,661 A | 2/1969 | Mayo |
| 3,439,897 A | 4/1969 | Priese et al. |
| 3,455,534 A | 7/1969 | Scaramucci |
| 3,467,224 A | 9/1969 | Curtis et al. |
| 3,472,479 A | 10/1969 | Sherwood |
| 3,554,581 A | 1/1971 | Mason et al. |
| 3,556,474 A | 1/1971 | Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,830,306 A | 8/1974 | Brown |
| 3,840,048 A | 10/1974 | Moen |
| 3,845,876 A | 11/1974 | Needham et al. |
| 3,845,879 A | 11/1974 | Dernbach et al. |
| 3,881,480 A | 5/1975 | Lafourcade |
| 3,894,718 A | 7/1975 | Koch et al. |
| 3,901,259 A | 8/1975 | Banbury |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A | 7/1976 | Kendrick |
| 3,972,364 A | 8/1976 | Brumm |
| 3,974,848 A | 8/1976 | Wheatley |
| 4,022,427 A | 5/1977 | Read |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,109,714 A | 8/1978 | Greenlee et al. |
| 4,113,228 A | 9/1978 | Frye |
| 4,146,047 A | 3/1979 | Wood et al. |
| 4,150,847 A | 4/1979 | De Cenzo |
| 4,158,510 A | 6/1979 | Smith et al. |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Haefele |
| 4,286,621 A | 9/1981 | Glahn |
| 4,308,916 A | 1/1982 | Fritz, Jr. |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,572,237 A | 2/1986 | Thompson |
| 4,590,957 A | 5/1986 | Mcfarlane |
| 4,597,505 A | 7/1986 | Mozley et al. |
| 4,605,036 A | 8/1986 | Smith et al. |
| 4,605,248 A | 8/1986 | Goldsmith |
| 4,616,803 A | 10/1986 | Schils |
| 4,634,154 A | 1/1987 | Arora et al. |
| 4,662,603 A | 5/1987 | Etheridge |
| 4,667,570 A | 5/1987 | Jensen, Jr. et al. |
| 4,705,306 A | 11/1987 | Guido et al. |

(56) References Cited

U.S. PATENT DOCUMENTS

| | | |
|---|---|---|
| 4,716,930 A | 1/1988 | Richmond et al. |
| 4,732,215 A | 3/1988 | Hopper |
| 4,802,695 A * | 2/1989 | Weinhold ............ F16L 19/005 |
| | | 285/354 |
| 4,836,240 A | 6/1989 | Elliott |
| 4,842,014 A | 6/1989 | Strelow et al. |
| 4,848,398 A | 7/1989 | Leach |
| 4,850,392 A | 7/1989 | Crump et al. |
| 4,864,696 A | 9/1989 | Mittermaier et al. |
| 4,896,367 A | 1/1990 | Newton et al. |
| 4,915,418 A | 4/1990 | Palatchy |
| 4,969,482 A | 11/1990 | Perrin et al. |
| 4,993,489 A | 2/1991 | Mcleod |
| 5,025,865 A | 6/1991 | Caldwell et al. |
| H000945 H | 8/1991 | Taliaferro et al. |
| 5,046,525 A | 9/1991 | Powell |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,165,478 A | 11/1992 | Wilson |
| 5,178,185 A | 1/1993 | Sterling et al. |
| 5,199,464 A | 4/1993 | Savard |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | Mcguire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor |
| 6,770,177 B2 | 8/2004 | Keller et al. |
| 6,843,265 B2 | 1/2005 | Taylor |
| 6,848,724 B2 | 2/2005 | Kessler |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,954,569 B2 | 9/2005 | Diaz et al. |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. et al. |
| 7,302,961 B2 | 12/2007 | Martin et al. |
| 7,350,832 B1 | 4/2008 | Kiely |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Lawrence et al. |
| D660,461 S | 5/2012 | Kotin et al. |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| D703,294 S | 4/2014 | Witkowski et al. |
| 8,695,627 B2 | 4/2014 | Kugelev et al. |
| D707,332 S | 6/2014 | Witkowski et al. |
| D707,797 S | 6/2014 | Witkowski et al. |
| 8,833,804 B2 * | 9/2014 | Myers ................... F16L 19/025 |
| | | 285/354 |
| 8,870,233 B2 | 10/2014 | Matzner et al. |
| 8,978,695 B2 | 3/2015 | Witkowski et al. |
| 8,998,168 B2 | 4/2015 | Witkowski |
| D734,434 S | 7/2015 | Witkowski et al. |
| 9,103,448 B2 | 8/2015 | Witkowski et al. |
| 9,273,543 B2 | 3/2016 | Baca et al. |
| 9,322,243 B2 | 4/2016 | Baca et al. |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0087232 A1 | 4/2005 | Kugelev et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0278394 A1 | 12/2006 | Stover |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |

(56) References Cited

U.S. PATENT DOCUMENTS

| | | |
|---|---|---|
| 2008/0142752 A1 | 6/2008 | Matzner |
| 2008/0196773 A1 | 8/2008 | Franconi |
| 2008/0264649 A1 | 10/2008 | Crawford |
| 2008/0295910 A1 | 12/2008 | Aleksandersen et al. |
| 2008/0308159 A1 | 12/2008 | Stunkard |
| 2009/0120635 A1 | 5/2009 | Neal |
| 2010/0154894 A1 | 6/2010 | Kotapish et al. |
| 2010/0193057 A1 | 8/2010 | Garner et al. |
| 2010/0258200 A1 | 10/2010 | Walker et al. |
| 2010/0288493 A1 | 11/2010 | Fielder, I et al. |
| 2011/0036415 A1 | 2/2011 | Lymberopoulos |
| 2011/0061871 A1 | 3/2011 | Omvik |
| 2011/0240126 A1 | 10/2011 | Lymberopoulos et al. |
| 2011/0272158 A1 | 11/2011 | Neal |
| 2011/0316274 A1 | 12/2011 | Groenlund et al. |
| 2012/0025114 A1 | 2/2012 | Lymberopoulos et al. |
| 2012/0031494 A1 | 2/2012 | Lymberopoulos |
| 2012/0060929 A1 | 3/2012 | Kendrick |
| 2012/0073670 A1 | 3/2012 | Lymberopoulos |
| 2012/0085541 A1 | 4/2012 | Love et al. |
| 2012/0091743 A1 | 4/2012 | Ohman, III et al. |
| 2012/0181013 A1 | 7/2012 | Kajaria et al. |
| 2012/0181015 A1 | 7/2012 | Kajaria et al. |
| 2012/0181016 A1 | 7/2012 | Kajaria et al. |
| 2012/0181046 A1 | 7/2012 | Kajaria et al. |
| 2012/0219354 A1 | 8/2012 | Bauer et al. |
| 2012/0227983 A1 | 9/2012 | Lymberopoulos et al. |
| 2012/0255734 A1 | 10/2012 | Coli et al. |
| 2012/0298213 A1 | 11/2012 | Forster et al. |
| 2012/0325332 A1 | 12/2012 | Ball et al. |
| 2013/0020519 A1 | 1/2013 | Lymberopoulos |
| 2013/0037125 A1 | 2/2013 | Drake et al. |
| 2013/0126152 A1 | 5/2013 | Banks et al. |
| 2013/0248182 A1 | 9/2013 | Chong et al. |
| 2013/0328301 A1 | 12/2013 | McGuire |
| 2015/0000766 A1 | 1/2015 | Arizpe et al. |
| 2015/0042088 A1 | 2/2015 | Witkowski et al. |
| 2015/0345646 A1 | 12/2015 | Witkowski et al. |
| 2016/0161956 A1 | 6/2016 | Baca et al. |

FOREIGN PATENT DOCUMENTS

| | | |
|---|---|---|
| AU | 348253 | 5/2013 |
| CA | 2350047 A1 | 12/2001 |
| CA | 2635751 A1 | 12/2001 |
| CA | 2636751 A1 | 1/2009 |
| CA | 2490664 C | 11/2009 |
| CA | 2485817 C | 8/2010 |
| CA | 2654848 A1 | 8/2010 |
| CA | 2503231 C | 6/2011 |
| CA | 2612397 C | 4/2013 |
| CA | 149748 | 11/2014 |
| CA | 152956 | 11/2014 |
| CA | 152957 | 11/2014 |
| CA | 2764310 C | 6/2015 |
| CN | 2118877 U | 10/1992 |
| CN | 1137309 A | 12/1996 |
| CN | 1225298 A | 8/1999 |
| CN | 2426550 Y | 4/2001 |
| CN | 1548701 A | 11/2004 |
| CN | 1908365 A | 2/2007 |
| CN | 2901281 Y | 5/2007 |
| CN | 200999609 Y | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 201162522 Y | 12/2008 |
| CN | 101367099 A | 2/2009 |
| CN | 201206648 Y | 3/2009 |
| CN | 201262043 Y | 6/2009 |
| CN | 101539218 | 9/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202031536 U | 11/2011 |
| CN | 202047762 U | 11/2011 |
| CN | 102323158 A | 1/2012 |
| CN | 202144943 U | 2/2012 |
| CN | 202208237 U | 5/2012 |
| CN | 202255848 U | 5/2012 |
| CN | 202255937 U | 5/2012 |
| CN | 202718658 U | 2/2013 |
| CN | ZL2013300399164 | 9/2013 |
| CN | ZL201330441389 X | 4/2014 |
| CN | 2013304412416 | 5/2014 |
| CN | ZL2010800253503 | 5/2014 |
| CN | ZL201330441 2416 | 5/2014 |
| DE | 1166571 B | 3/1964 |
| DE | 2415732 A1 | 10/1974 |
| DE | 2358756 A1 | 3/1975 |
| DE | 2558272 | 7/1977 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EC | EU002185371-001 | 2/2013 |
| EC | 002307421-0001 | 9/2013 |
| EC | 002307421-0002 | 9/2013 |
| EP | 0044619 A1 | 1/1982 |
| EP | 0559131 B1 | 1/1996 |
| EP | 1219942 B1 | 8/2004 |
| EP | 1488867 A1 | 12/2004 |
| EP | 2438338 | 4/2015 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 1/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |
| GB | 2521300 A | 6/2015 |
| IN | 251691 | 8/2012 |
| JP | 53108873 A | 9/1978 |
| JP | 53125261 A | 11/1978 |
| JP | 57073187 | 5/1982 |
| JP | 57079400 | 5/1982 |
| JP | 61093344 | 5/1986 |
| JP | 5033883 A | 2/1993 |
| JP | 08075022 | 3/1996 |
| JP | 08128536 | 5/1996 |
| JP | 08291543 | 5/1996 |
| JP | 08300052 | 11/1996 |
| JP | 10175026 | 6/1998 |
| JP | 2000330646 | 11/2000 |
| JP | 2001355774 | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 5/2012 |
| KR | 100540389 B1 | 12/2005 |
| KR | 100540390 B1 | 12/2005 |
| KR | 100540392 B1 | 12/2005 |

(56) References Cited

FOREIGN PATENT DOCUMENTS

| | | |
|---|---|---|
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 40533 | 12/2013 |
| MX | 324905 | 10/2014 |
| NL | 258255 | 4/1964 |
| RU | 1466084 C | 6/1995 |
| RU | 1417281 C | 7/1995 |
| RU | 2088831 C1 | 8/1997 |
| RU | 2242313 C2 | 12/2004 |
| RU | 2367770 C1 | 9/2009 |
| RU | 2367771 C1 | 9/2009 |
| SG | 175263 | 11/2012 |
| SG | 176534 | 11/2012 |
| SG | 02013/186 G | 2/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | 9713398 A2 | 4/1997 |
| WO | 9956047 A2 | 11/1999 |
| WO | 2009023042 A1 | 2/2009 |
| WO | 2010080636 A2 | 7/2010 |
| WO | 2010123889 A2 | 10/2010 |
| WO | 2010141651 A2 | 12/2010 |
| WO | 2010151680 A2 | 12/2010 |
| WO | 2011095453 A1 | 8/2011 |
| WO | 2013023154 A1 | 2/2013 |
| WO | 2014028498 A2 | 2/2014 |
| WO | 2014028795 A2 | 2/2014 |
| WO | 2014/042643 A1 | 3/2014 |
| WO | 2015002863 A1 | 1/2015 |

OTHER PUBLICATIONS

Written Opinion issued re International Application No. PCT/US2016/037391 by ISA/US dated Sep. 9, 2016 (8 pages).
"The Strength of Screw Threads Under Repeated Tension" by Herbert F. Moore and Proctor E. Henwood, University of Illinois Engineering Experiment Station, Bulletin No. 264, Mar. 1934 (Mar. 1934).
"Windlass Engineers & Services," Hammer Unions (Windglass Engineers), Mar. 11, 2015, <URL: http://www.windlassengineers.com/products/hammer-unions/>.
"Notice of Allowance dated Oct. 27, 2015, by the USPTO, re U.S. Appl. No. 13/964,863, 5 pages."
"Notice of Allowance dated Sep. 23, 2008, by the USPTO, re U.S. Appl. No. 11/638,965, 6 pages."
"Office Action dated Apr. 25, 2014, by the USPTO, re U.S. Appl. No. 13/608,562, 31 pages."
"Office Action dated Apr. 30, 2015, by the USPTO, re U.S. Appl. No. 13/886,771, 13 pages."
"Office Action dated Apr. 4, 2008, by the USPTO, re U.S. Appl. No. 11/638,965, 10 pages."
"Office Action dated Aug. 16, 2013, by the USPTO, re U.S. Appl. No. 12/822,900, 15 pages."
"Office Action dated Aug. 30, 2005, by the USPTO, re U.S. Appl. No. 11/013,486, 12 pages."
"Office Action dated Aug. 9, 2011, by the USPTO, re U.S. Appl. No. 12/165,680, 18 pages."
"Office Action dated Dec. 22, 2004, by the USPTO, re U.S. Appl. No. 10/833,859, 5 pages."
"Office Action dated Dec. 30, 1996, by the USPTO, re U.S. Appl. No. 08/643,239, 11 pages."
"Office Action dated Dec. 6, 2012, by the USPTO, re U.S. Appl. No. 12/822,900, 20 pages."
"Office Action dated Feb. 2, 2013, by the Russian Patent Office, re App No. 2013500548, 2 pages."
"Office Action dated Feb. 28, 2014, by the USPTO, re U.S. Appl. No. 12/165,680, 60 pages."
"Office Action dated Jan. 31, 2012, by the USPTO, re U.S. Appl. No. 12/165,680, 28 pages."
"Office Action dated Jan. 5, 2015, by the USPTO, re U.S. Appl. No. 13/572,293, 12 pages."
"Office Action dated Jan. 8, 2010, by the USPTO, re U.S. Appl. No. 11/354,663, 6 pages."
"Office Action dated Jul. 10, 2015, by the USPTO, re U.S. Appl. No. 13/964,863, 36 pages."
"Office Action dated Jul. 12, 2013, by the USPTO, re U.S. Appl. No. 12/165,680, 24 pages."
"Office Action dated Jul. 31, 2014, by the USPTO, re U.S. Appl. No. 13/965,848, 44 pages."
"Office Action dated Jun. 18, 2014, by the USPTO, re U.S. Appl. No. 13/572,293, 29 pages."
"Office Action dated Mar. 19, 2012, by the USPTO, re U.S. Appl. No. 12/642,541, 15 pages."
"Office Action dated Mar. 27, 2014, by the USPTO, re U.S. Appl. No. 13/918,479, 13 pages."
"Office Action dated May 31, 2011, from the UK IP Office, re App No. GB0812086.7, 2 pages."
"Office Action dated Nov. 17, 1983, by the USPTO, re U.S. Appl. No. 06/419,141, 4 pages."
"Office Action dated Oct. 11, 2011, by the USPTO, re U.S. Appl. No. 12/763,786, 9 pages."
"Office Action dated Oct. 25, 2012, by the USPTO, re U.S. Appl. No. 12/793,194, 8 pages."
"Office Action dated Sep. 13, 2013, by the USPTO, re U.S. Appl. No. 13/608,562, 12 pages."
"Office Action dated Mar. 7, 2013, by the USPTO, re U.S. Appl. No. 12/165,680, 23 pages."
"Office Action dated Nov. 6, 2014, by the USPTO, re U.S. Appl. No. 13/965,848, 12 pages."
"Oksanen, K. et al, "Singer Model DLA-RPS—Air Operated Surge Anticipating Electrically Timed Sewage Relief Valve; Schematic A-8809A," Singer Valve, Dec. 8, 2010, XP055159354, 3 pages."
""Product Data Sheet, 10 Station AFAM Trailer," FMC Technologies (www.fmctechnologies.com), PDS50002076-A, Oct. 28, 2011, 6 pages."
Reset Relief Valves brochure, Harrisburg, Inc., 1982, 2 pages.
SPM Flow Control, Inc., "Flow Control Products and Drilling Equipment for the Worldwide Petroleum Industry," [Online] Jan. 8, 2007, 28 pages.
SPM Flow Control, Inc., "High-Pressure Long Radius Swivel Joints," 2002, 1 page.
SPM Flow Control, Inc., "Long Radius Swivel Joints—Operating and Maintenance Instructions—H2S," 1999, 6 pages.
SPM Flow Control, Inc., "Long Radius Swivel Joints—Operating and Maintenance Instructions," 2004, 4 pages.
SPM Flow Control, Inc., "Long Radius Swivel Joints—Operating and Maintenance Instructions," 2006, 6 pages.
SPM Flow Control, Inc., "Long Radius Swivel Joints," 2007, 5 pages.
SPM Flow Control, Inc., "Swivel Joints," 1999, 1 page.
Supplementary European Search Report for Application No. EP09838004 dated Jan. 30, 2013, 4 pages.
"U.S. Appl. No. 60/653,014, filed Feb. 15, 2005, "Flowline Torque Arm Assembly," 16 pages."
"U.S. Appl. No. 60/947,738, filed Jul. 3, 2007, "Swivel Joint with Uniform Ball Bearing Requirements," 12 pages."
"U.S. Appl. No. 61/170,917, filed Apr. 20, 2009, "Flowline Flapper Valve," 9 pages."
"U.S. Appl. No. 61/220,067, filed Jun. 24, 2009, "Stand for Pressure Relief Valve," 12 pages."
"U.S. Appl. No. 61/522,234, filed Aug. 10, 2011, "Rupture Disk Relief Valve," 23 pages."
Valve illustration, Retsco Inc., 1992, 1 page.
"Weir SPM Safety Iron Manifold Trailer, 2008, 2 pages".
"Advisory Action dated May 20, 2013, by the USPTO, re U.S. Appl. No. 12/165,680, 3 pages."
"An Introduction to Rupture Disk Technology," Catalog 77-1001, BS&B Safety Systems, 1994, 3 pages.

(56) References Cited

OTHER PUBLICATIONS

"Australian Examination Report, dated Sep. 25, 2014, by IP Australia, re App No. 2010239366, 3 pages."
"Brazil Office Action, dated Jun. 3, 2014, by Brazilian Patent Office, re App No. BR302013000661l, 2 pages."
"Canadian Examination Report dated Apr. 28, 2014, by CIPO, re App No. 2764310, 3 pages."
"Canadian Examination Report dated Feb. 10, 2014, by CIPO, re App No. 152956, 3 pages."
"Canadian Examination Report dated Feb. 7, 2014, by CIPO, re App No. 149748, 1 page."
"Canadian Examination Report dated Jul. 29, 2014, by CIPO, re App No. 2636751, 3 pages."
"Canadian Examiner's Report dated Feb. 10, 2014, by CIPO, re App No. 152957, 3 pages."
"Canadian Notice of Allowance dated Dec. 17, 2014, by CIPO, re App No. 2764310, 1 page."
"Canadian Notice of Allowance dated Dec. 20, 2012, by CIPO, re App No. 2612397, 1 page."
"Canadian Notice of Allowance dated Jun. 22, 2015, by CIPO, re App No. 2636751, 1 page."
"Chinese Office Action dated Jun. 5, 2013, by SIPO, re App No. 2010800253503, 8 pages."
"Chinese Office Action dated Nov. 18, 2016, by SIPO, re App No. 201380054054, 13 pages."
"Co-pending U.S. Appl. No. 29/453,837, filed May 3, 2013, 8 pages."
"Second Written Opinion of the International Preliminary Examining Authority, dated Jul. 28, 2014, by the IPEA/US, re PCT/US2013/054741, 7 pages."
Emergency Relief Valve Brochure, SPM, 1997, 4 pages.
"Eurasian Office Action dated Nov. 19, 2013, by the Eurasian Patent Office, re App No. 201171356/31, 8 pages."
"European Examination Report dated Apr. 8, 2014, by the EPO, re App No. 10784052.2, 5 pages."
"European Search Report dated Jul. 4, 2013, by the EPO, re App No. 10784052.2, 7 pages."
"European Search Report dated Mar. 5, 2013, by the EPO, re App No. 10767632.2, 6 pages."
"Examination Report dated Apr. 26, 2013, by IP India, re App No. 251691, 2 pages."
"International Preliminary Report on Patentability dated Jul. 15, 2013, by the IPEA/US, re App No. PCT/US2012/050376, 28 pages."
"International Preliminary Report on Patentability dated Nov. 17, 2014, by the IPEA/US, re App No. PCT/US2013/054741, 31 pages."
"International Search Report and Written Opinion dated Dec. 16, 2014, by the ISA/US, re App No. PCT/US2014/044813, 12 pages."
"International Search Report and Written Opinion dated Feb. 7, 2017, by the ISA/US, re App No. PCT/US2013/054741, 10 pages."
"International Search Report and Written Opinion dated Jan. 23, 2015, by the ISA/EP, re App No. PCT/US2013/055257, 15 pages."
International Search Report and Written Opinion for Application No. PCT/US2009/068822 dated Aug. 9, 2010, 7 pages.
International Search Report and Written Opinion for Application No. PCT/US2010/031738 dated Dec. 27, 2010, 7 pages.
International Search Report and Written Opinion for Application No. PCT/US2010/037156 dated Jan. 13, 2011, 8 pages.
International Search Report and Written Opinion for Application No. PCT/US2010/039834 dated Feb. 8, 2011, 6 pages.
International Search Report and Written Opinion for Application No. PCT/US2012/050376 dated Oct. 26, 2012, 10 pages.
"Notice of Allowance dated Apr. 10, 2015, by the USPTO, re U.S. Appl. No. 29/493,861, 8 pages."
"Notice of Allowance dated Apr. 9, 2015, by the USPTO, re U.S. Appl. No. 13/965,848, 8 pages."
"Notice of Allowance dated Aug. 29, 2005, by the USPTO, re U.S. Appl. No. 10/690,888, 7 pages."
"Notice of Allowance dated Dec. 17, 2015, by the USPTO, re U.S. Appl. No. 13/886,771, 13 pages."
"Notice of Allowance dated Dec. 26, 2014, by the USPTO, re U.S. Appl. No. 13/918,479, 10 pages."
"Notice of Allowance dated Feb. 11, 2009, by the USPTO, re U.S. Appl. No. 11/414,984, 8 pages."
"Notice of Allowance dated Feb. 12, 2007, by the USPTO, re U.S. Appl. No. 11/013,486, 4 pages."
"Notice of Allowance dated Feb. 19, 2013, by the USPTO, re U.S. Appl. No. 12/793,194, 10 pages."
"Notice of Allowance dated Feb. 7, 2014, by the USPTO, re U.S. Appl. No. 29/449,852, 31 pages."
"Notice of Allowance dated Feb. 7, 2014, by the USPTO, re U.S. Appl. No. 29/449,867, 31 pages."
"Notice of Allowance dated Jan. 16, 2014, by the USPTO, re U.S. Appl. No. 29/453,837, dated 39 pages."
"Notice of Allowance dated Jul. 6, 2005, by the USPTO, re U.S. Appl. No. 10/833,859, 4 pages."
"Notice of Allowance dated Jun. 25, 2014, by the USPTO, re U.S. Appl. No. 12/165,680, 12 pages."
"Notice of Allowance dated Jun. 29, 2010, by the USPTO, re U.S. Appl. No. 11/354,663, 5 pages."
"Notice of Allowance dated May 16, 2012, by the USPTO, re U.S. Appl. No. 12/763,786, 6 pages."
"Notice of Allowance dated Nov. 22, 2013, by the USPTO, re U.S. Appl. No. 12/822,900, 10 pages."
"Notice of Allowance dated Nov. 26, 2013, by the USPTO, re U.S. Appl. No. 29/429,809, 11 pages."
"Notice of Allowance dated Nov. 28, 2014, by the USPTO, re U.S. Appl. No. 13/608,562, 36 pages."

\* cited by examiner

FULL-ROOT-RADIUS-THREADED WING NUT HAVING INCREASED WALL THICKNESS

CROSS-REFERENCE TO RELATED APPLICATIONS

This application is a continuation of U.S. application Ser. No. 15/182,192 filed Jun. 14, 2016, now U.S. Pat. No. 10,557,576, which claims the benefit of U.S. Application No. 62/286,079 filed Jan. 22, 2016 and U.S. Application No. 62/175,838 filed Jun. 15, 2015, the entire disclosure of which is hereby incorporated herein by reference.

TECHNICAL FIELD

This disclosure relates in general to a wing nut of a hammer union and, in particular, to a full-radius-threaded wing nut having an increased wall thickness.

BACKGROUND OF THE DISCLOSURE

Threaded pipe unions, which are often called "hammer unions," generally include a male sub, a threaded wing nut, and a female sub. These hammer unions often form a part of a system that is used to facilitate oil and gas exploration and production operations. One example is a hydraulic fracturing (or "frac") system, which pumps fluid to a wellhead for the purpose of propagating factures in a formation through which a wellbore extends, the wellhead being the surface termination of the wellbore. When used in a frac system, the threaded wing nut may be subjected to high stress, which may result in cracks propagating near a threaded portion of the wing nut. These cracks often lead to failure of the hammer union. Therefore, what is needed is an apparatus that addresses one or more of the foregoing issues or other(s).

SUMMARY

In a first aspect, there is provided a hammer union, that includes a threaded female sub; a male sub; and a threaded wing nut that is concentrically disposed about each of the threaded female sub and the male sub to couple the female sub to the male sub; wherein the threaded wing nut includes: a body having an axial length defined between first and second end surfaces, the body having an exterior surface extending between the first and second end surfaces; a passage axially extending through the body from the first end surface to the second end surface, wherein the passage defines an interior surface of the body; a first internal shoulder formed in the body and defining a portion of the passage; an internal threaded connection formed by the interior surface that extends from the first end surface and towards the first internal shoulder; and a plurality of circumferentially-spaced lugs extending radially from the exterior surface of the body; wherein the body has a variable wall thickness defined between the interior surface of the body and the exterior surface of the body, with the variable wall thickness at the internal shoulder being greater than the variable wall thickness at the first end surface; wherein the internal threaded connection has a full-root radius; and wherein a first lug of the plurality of lugs extends along the axial length of the body.

In an exemplary embodiment, the variable wall thickness at the first internal shoulder is greater than the variable wall thickness at the first end surface; and the variable wall thickness at the internal shoulder is about 0.75 inches and the variable wall thickness at the first end surface is about 0.6 inches.

In another exemplary embodiment, the exterior surface of the body defines an outer circumference and an outer diameter; a first lug of the plurality of lugs defines a width measured along a line that is tangential to the outer circumference of the body; and the ratio of the outer diameter of the body to the width of the first lug is between about 2.5 and about 5.5.

In yet another exemplary embodiment, the outer diameter of the body is about seven inches; and the width of the first lug is about two inches such that the ratio of the outer diameter of the body to the width of the first lug is about 3.5.

In certain embodiments, the variable wall thickness at the internal shoulder being greater than the variable wall thickness at the first end surface results in increased rigidity of the body; the internal threaded connection having a full-root radius reduces the amount of stress exerted on the internal threaded connection; and the first lug of the plurality of lugs extending along the axial length of the body increases the durability of the wing nut.

In an exemplary embodiment, the threaded wing nut further includes a second internal shoulder formed by the interior surface of the body; and the second internal shoulder defines another portion of the passage that is axially positioned between the internal threaded connection and the first internal shoulder.

In another exemplary embodiment, the internal threaded connection of the wing nut is adapted to engage a corresponding external threaded connection of the threaded female sub to couple the threaded female sub to the male sub.

In a second aspect, there is provided a wing nut for a hammer union that includes: a body having an axial length defined between first and second end surfaces, the body having an exterior surface extending between the first and second end surfaces; a passage axially extending through the body from the first end surface to the second end surface, wherein the passage defines an interior surface of the body; a first internal shoulder formed by the interior surface of the body and defining a portion of the passage; an internal threaded connection formed by the interior surface of the body and defining another portion of the passage, wherein the internal threaded connection extends from the first end surface and towards the first internal shoulder; and a plurality of circumferentially-spaced lugs extending radially from the exterior surface of the body; wherein: the body has a variable wall thickness defined between the interior surface of the body and the exterior surface of the body, with the variable wall thickness at the first internal shoulder being greater than the variable wall thickness at the first end surface; the internal threaded connection has a full-root radius; or a first lug of the plurality of lugs extends along the axial length of the body.

In an exemplary embodiment, the internal threaded connection has the full-root radius.

In another exemplary embodiment, the internal threaded connection having the full-root radius reduces the amount of stress exerted on the internal threaded connection.

In yet another exemplary embodiment, the first lug of the plurality of lugs extends along the axial length of the body.

In certain exemplary embodiments, the first lug extending along the axial length of the body increases the durability of the wing nut.

In an exemplary embodiment, the body has the variable wall thickness defined between the interior surface of the body and the exterior surface of the body, with the variable wall thickness at the first internal shoulder being greater than the variable wall thickness at the first end surface.

In another exemplary embodiment, the variable wall thickness at the first internal shoulder being greater than the variable wall thickness at the first end surface results in increased rigidity of the body.

In yet another exemplary embodiment, the exterior surface of the body defines an outer circumference and an outer diameter; wherein the first lug of the plurality of lugs extends along the axial length of the body; wherein the first lug of the plurality of lugs defines a width measured along a line that is tangential to the outer circumference of the body; and wherein the ratio of the outer diameter of the body to the width of the first lug is between about 2.5 and about 5.5.

In certain embodiments, the outer diameter of the body is about seven inches; and the width of the first lug is about two inches such that the ratio of the outer diameter of the body to the width of the first lug is about 3.5.

In an exemplary embodiment, a the internal threaded connection of the wing nut is adapted to engage a corresponding external threaded connection of a female sub to couple the female sub to a male sub and at least partially form the hammer union.

In another exemplary embodiment, the variable wall thickness at the first internal shoulder is about 0.75 inches and the variable wall thickness at the first end surface is about 0.6 inches.

In yet another exemplary embodiment, the first lug of the plurality of lugs extends along the axial length of the body and the internal threaded connection has the full-root radius.

In certain embodiments, the first lug of the plurality of lugs extends along the axial length of the body, the internal threaded connection has the full-root radius, and the body has the variable wall thickness defined between the interior surface of the body and the exterior surface of the body, with the variable wall thickness at the first internal shoulder being greater than the variable wall thickness at the first end surface.

In an exemplary embodiment, the first lug of the plurality of lugs extends along the axial length of the body and the body has the variable wall thickness defined between the interior surface of the body and the exterior surface of the body, with the variable wall thickness at the first internal shoulder being greater than the variable wall thickness at the first end surface.

In another exemplary embodiment, the internal threaded connection has the full-root radius and the body has the variable wall thickness defined between the interior surface of the body and the exterior surface of the body, with the variable wall thickness at the first internal shoulder being greater than the variable wall thickness at the first end surface.

DESCRIPTION OF FIGURES

The accompanying drawings facilitate an understanding of the various embodiments.

DETAILED DESCRIPTION

Figure 1:
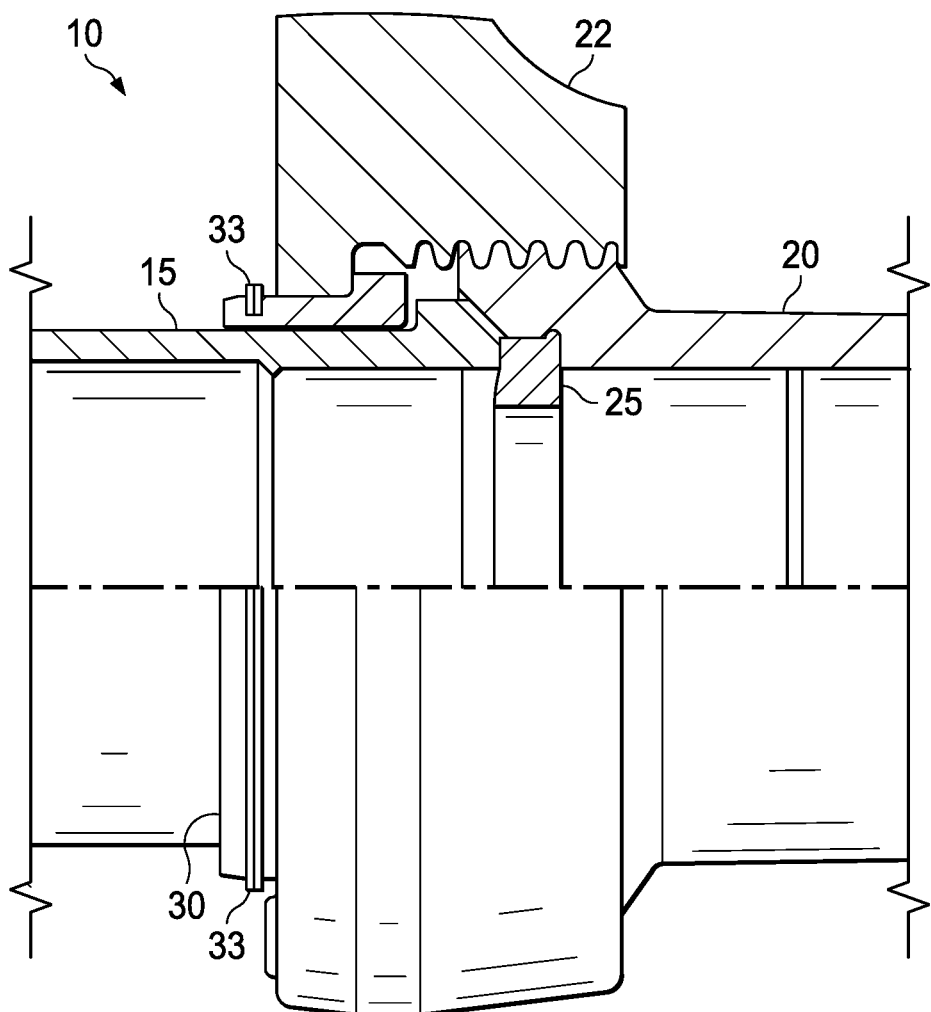
FIG. 1 is a side view with a partial cut out of a hammer union, according to an exemplary embodiment, the hammer union including a wing nut.

In an exemplary embodiment, as illustrated in FIG. 1, a hammer union is generally referred to by the reference numeral 10 and includes a male sub 15, a threaded female sub 20, a wing nut 22, a seal ring 25, a plurality of retainer segments 30, and a retainer ring 33. Generally, the female sub 20 is concentrically disposed about the seal ring 25, with the seal ring 25 engaging both the female sub 20 and the male sub 15. Opposing faces of the female sub 20 and male sub 15 are engaged and the plurality of retainer segments 30, which are held together using the retainer ring 33, are concentrically disposed about the male sub 15. The wing nut 22 is concentrically disposed about each of the male sub 15, the plurality of retainer segments 30, the seal ring 25, and the female sub 20 to couple the male sub 15 to the female sub 20.

Figure 2:
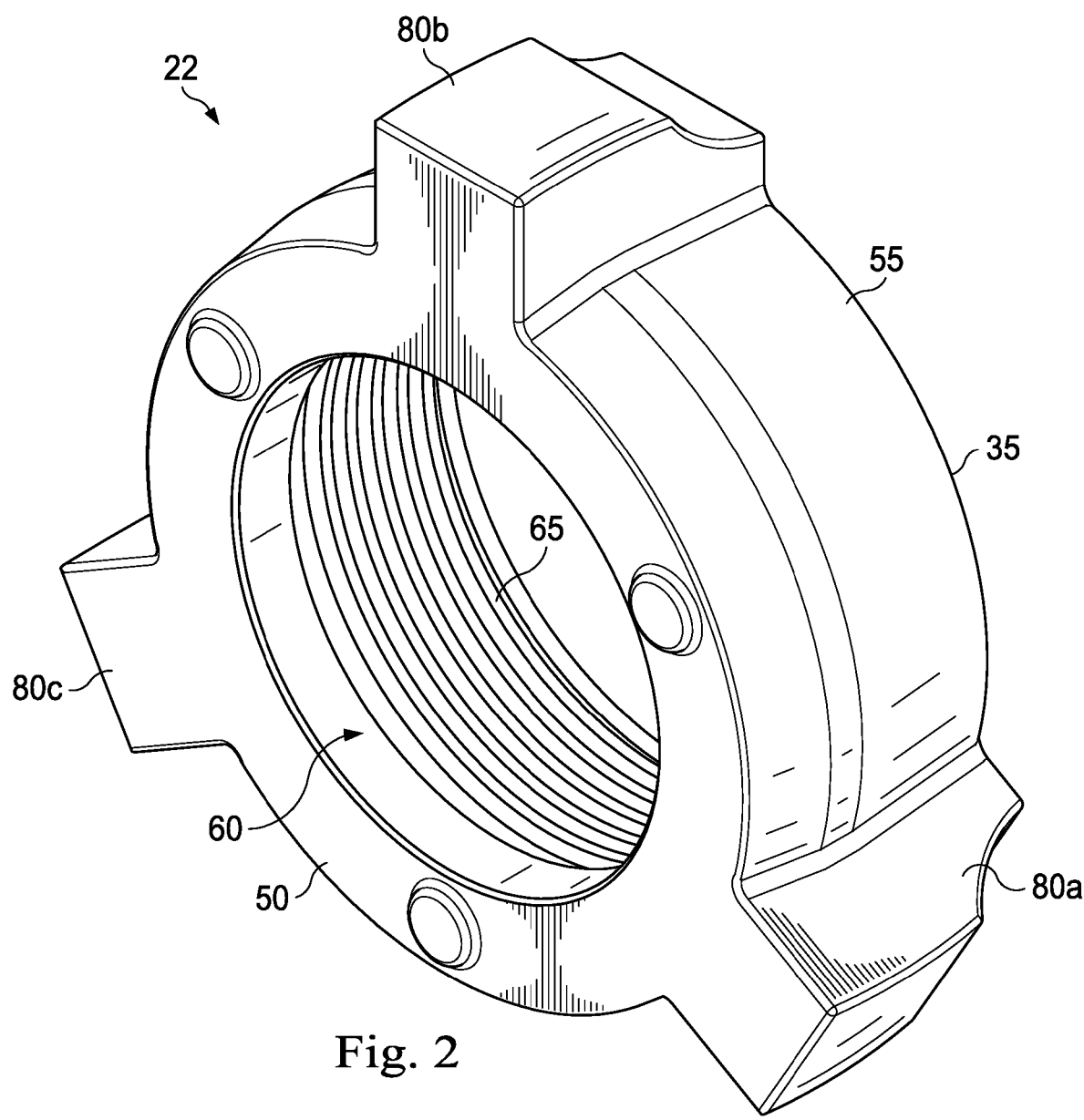
FIG. 2 is a perspective view of the wing nut of FIG. 1, according to an exemplary embodiment.

As shown in FIGS. 2 and/or 3, the wing nut 22 has a body 35 having an axial length 40 defined between a first end surface 45 and a second end surface 50. The body 35 also has an exterior surface 55 extending between the first and second end surfaces 45 and 50. The wing nut 22 also includes a passage 60 axially extending through the body 35 from the first end surface 45 to the second end surface 50. The passage 60 defines an interior surface 65 of the body 35. An internal shoulder 70 is formed in the body 35 and defines a portion of the passage 60. The wing nut 22 also has an internal threaded connection 75 formed by the interior surface 65 that extends from the first end surface 45 and towards the internal shoulder 70. The wing nut 22 also has circumferentially-spaced lugs 80a, 80b, and 80c extending radially from the exterior surface 55 of the body 35.

Figure 3:
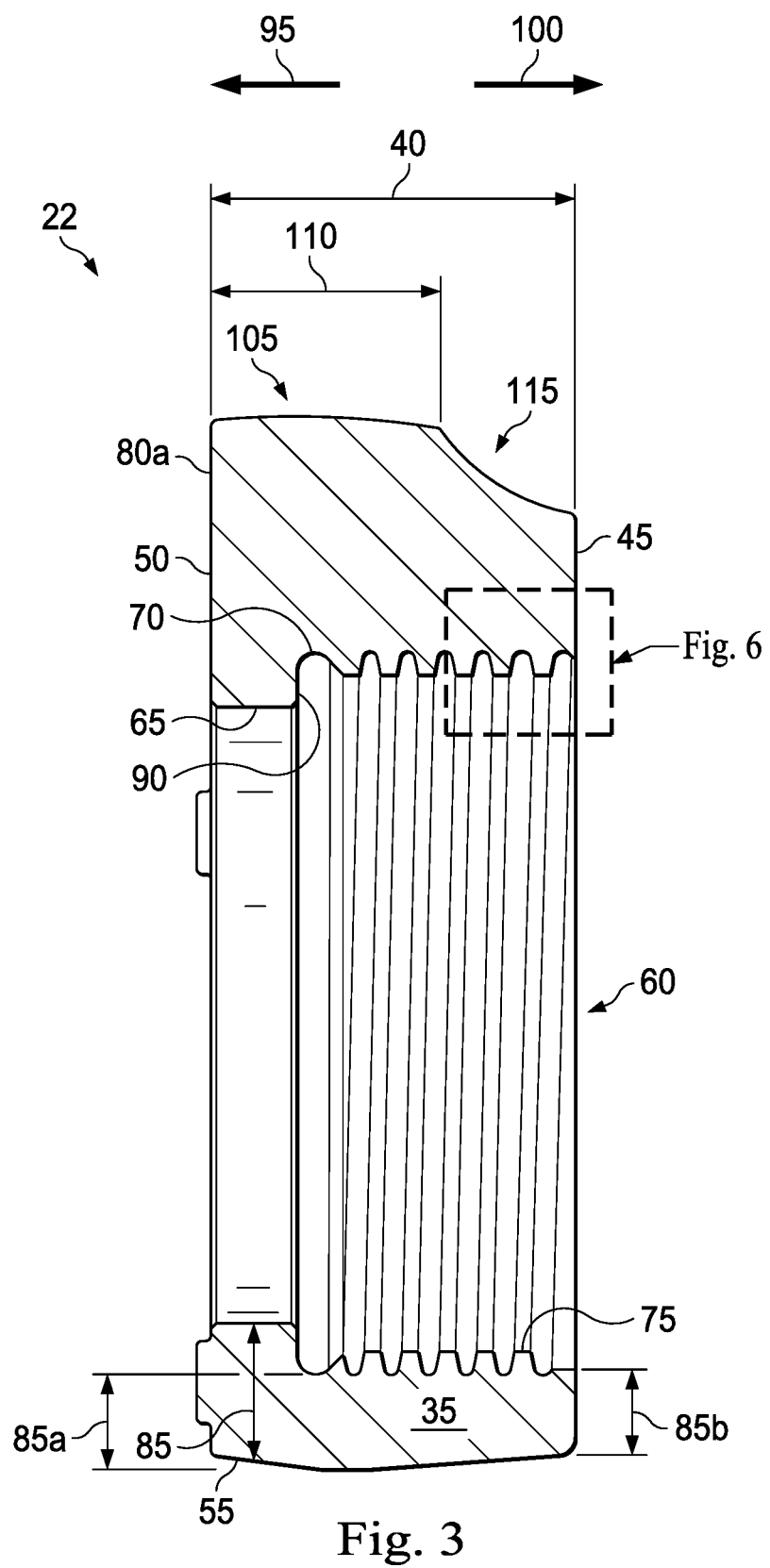
FIG. 3 is a sectional view of the wing nut of FIG. 2, according to an exemplary embodiment, the wing nut including a threaded connection.

As shown in FIG. 3, the body 35 has a variable wall thickness 85 defined between the interior surface 65 of the body 35 and the exterior surface 55 of the body 35, with a variable wall thickness 85a at the internal shoulder 70 being greater than a variable wall thickness 85b at or near the first end surface 45. In an exemplary embodiment, and when the wing nut 22 is a three (3) inch nominal pipe size wing nut, the variable wall thickness 85a at the internal shoulder is about 0.75 inches and the variable wall thickness 85b at or near the first end surface 45 is about 0.6 inches. However, the variable wall thickness 85a may also be about 0.7 inches and the variable wall thickness 85b at or near the first end surface 45 may be about 0.54 inches. The variable wall thickness 85 may vary along the axial length 40 of the body 35, with the variable wall thickness 85 increased at locations that are expected to experience high stress. For example, the body 35 may form a radially extending face 90 that engages the plurality of retainer segments 30, which may apply a force in the direction indicated by the numeral 95 in FIG. 3 ("the direction 95") to the face 90. Additionally, the female threaded sub 20 engages the threaded connection 75 and may apply a force in the direction indicated by the numeral 100 in FIG. 3 ("the direction 100") to the threaded connection 75 and the wing nut 22. In an exemplary embodiment, cracks often form in the portion of the body 35 that extends between the face 90 and the threaded connection 75. Thus, the variable wall thickness 85 associated with this area may be increased relative to other portions of the body 35 to increase the rigidity of the body 35 and the wing nut 22. Additionally, the variable wall thickness 85b may be greater than a corresponding wall thickness in a conventional wing nut.

In an exemplary embodiment, the increased wall thickness 85 may prevent failure of the wing nut 22 by preventing cracks or other failures from occurring near the internal threaded connection 75. In an exemplary embodiment, the increased wall thickness 85 reinforces areas within the wing nut 22 that are expected to undergo high stress.

The outer surface of lug 80a includes a first portion 105 extending in the direction 100 from the second surface 50 by a first portion length 110 and a second portion 115 extending in the direction 95 from the first surface 45 and towards the first portion 105. In an exemplary embodiment the ratio of the axial length 40 of the body 35 to the first portion length 110 is between about one and about three. In an exemplary embodiment, and when the wing nut 22 is a three (3) inch nominal pipe size wing nut, the axial length 40 of the body 35 is about 2.75 inches and the first portion length 110 is about 1.75 such that the ratio is about 1.57. In an exemplary embodiment, the axial length 40 of the body 35 is equal to or substantially equal (within 10%) to the first portion length 110 and a length of the second portion 115. That is, the lug 80a extends along the axial length 40 of the body 35.

Figure 4:
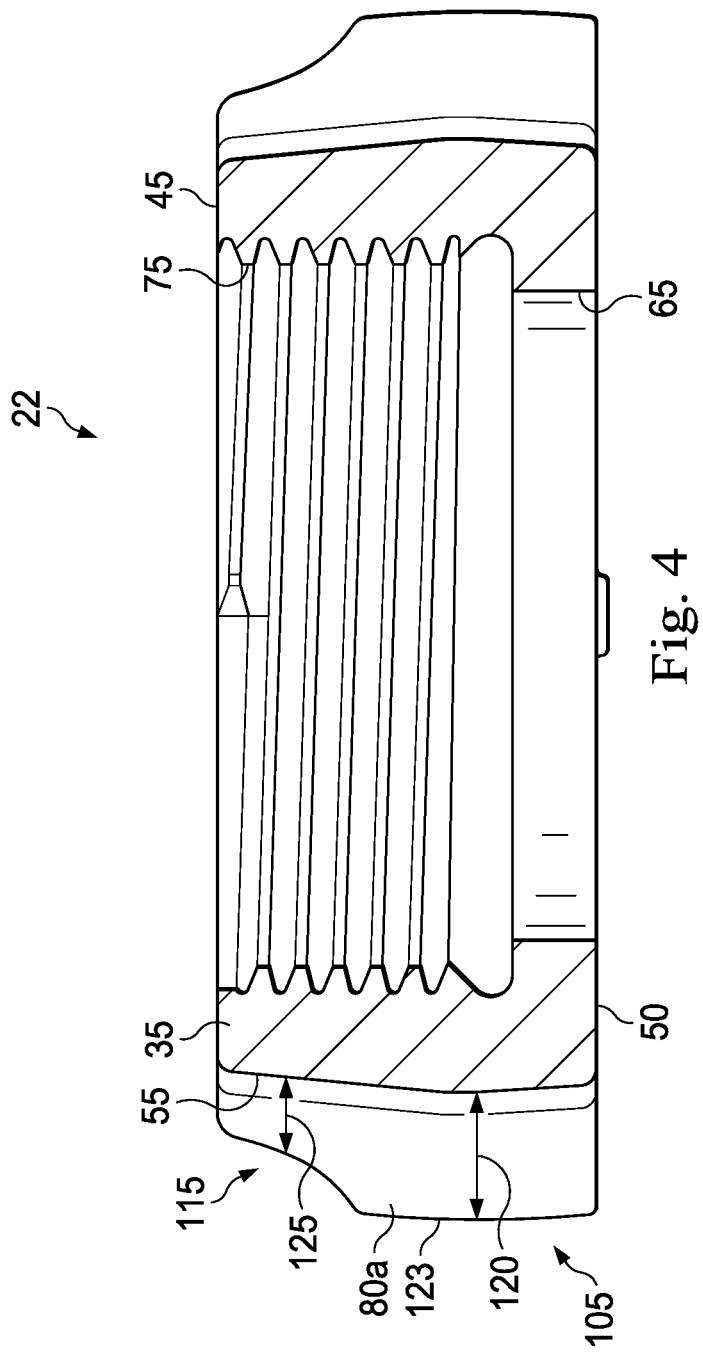
FIG. 4 is another sectional view of the wing nut of FIG. 2, according to an exemplary embodiment.

As shown in FIG. 4, the first portion 105 has a thickness 120 defined between the exterior surface 55 of the body 35 and an exterior surface 123 of the lug 80a. Additionally, the second portion 115 has a thickness 125 defined between the exterior surface 55 of the body 35 and the exterior surface 123 of the lug 80a. In an exemplary embodiment, the thickness 125 of the second portion 115 varies from a maximum height at a location where the first portion 105 and the second portion 115 join to a minimum height at the first surface 45. Accordingly, the thickness 125 is equal to or less than the thickness 120. In an exemplary embodiment, the thickness 120 is between about 5 inches to about 1 inch. In an exemplary embodiment, the thickness 120 is between about 1 inch and about 2 inches. In an exemplary embodiment, and when the wing nut 22 is a three (3) inch nominal pipe size wing nut, the thickness 120 is about 1.34 inches. However, the thickness 120 may also be about 1.05 inches. In an exemplary embodiment, the thickness 125 is between about 2.5 inches to about 1 inch. In an exemplary embodiment, the thickness 125 is between about 1 inch and about 0.25 inches. In an exemplary embodiment, the thickness 125 at the first end surface 45 is about 0.5 inches.

Figure 5:
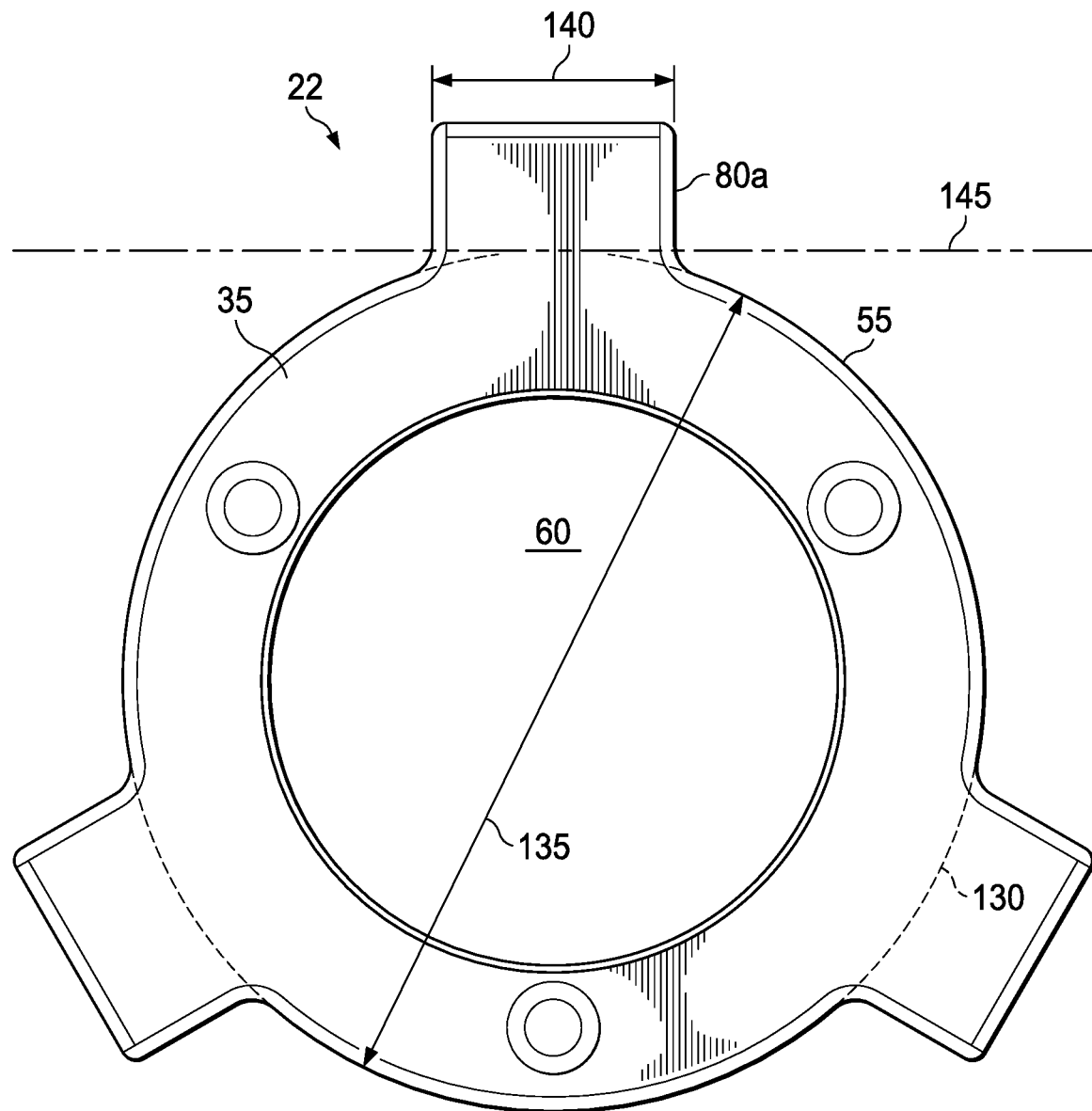
FIG. 5 is a side view of the wing nut of FIG. 2, according to an exemplary embodiment.

As shown in FIG. 5, the exterior surface 55 of the body 35 defines an outer circumference 130 and an outer diameter 135. The lug 80a defines a width 140 measured along a line 145 that is tangential to the outer circumference 130 of the body 35. In an exemplary embodiment, the ratio of the outer diameter 135 of the body 35 to the width 140 of the lug 80a is between about 2.5 and about 5.5. In an exemplary embodiment and when the wing nut 22 is a three (3) inch nominal pipe size wing nut, the outer diameter 135 of the body 35 is about 6.9 inches and the width 140 of the lug 80a is about two inches such that the ratio of the outer diameter 135 to the width 140 of the lug 80a is about 3.45.

Figure 6:
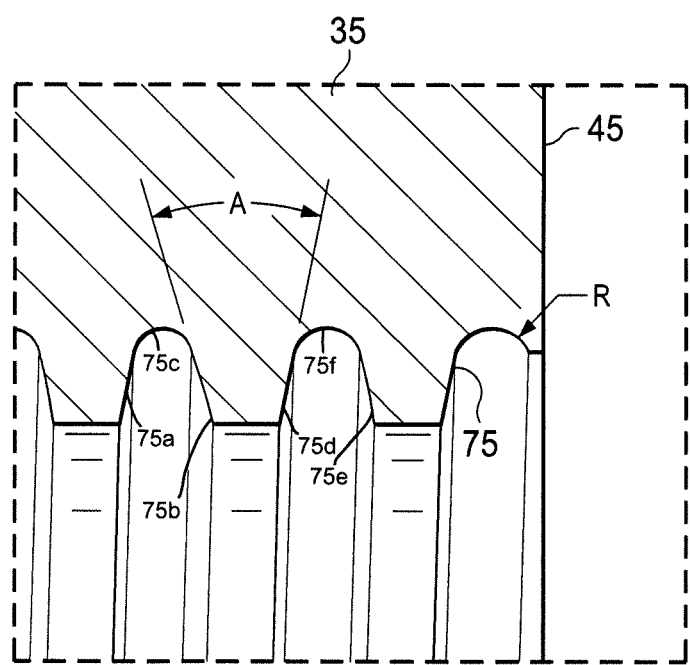
FIG. 6 is an enlarged portion of the threaded connection of the wing nut of FIG. 3, according to an exemplary embodiment.
Figure 7:
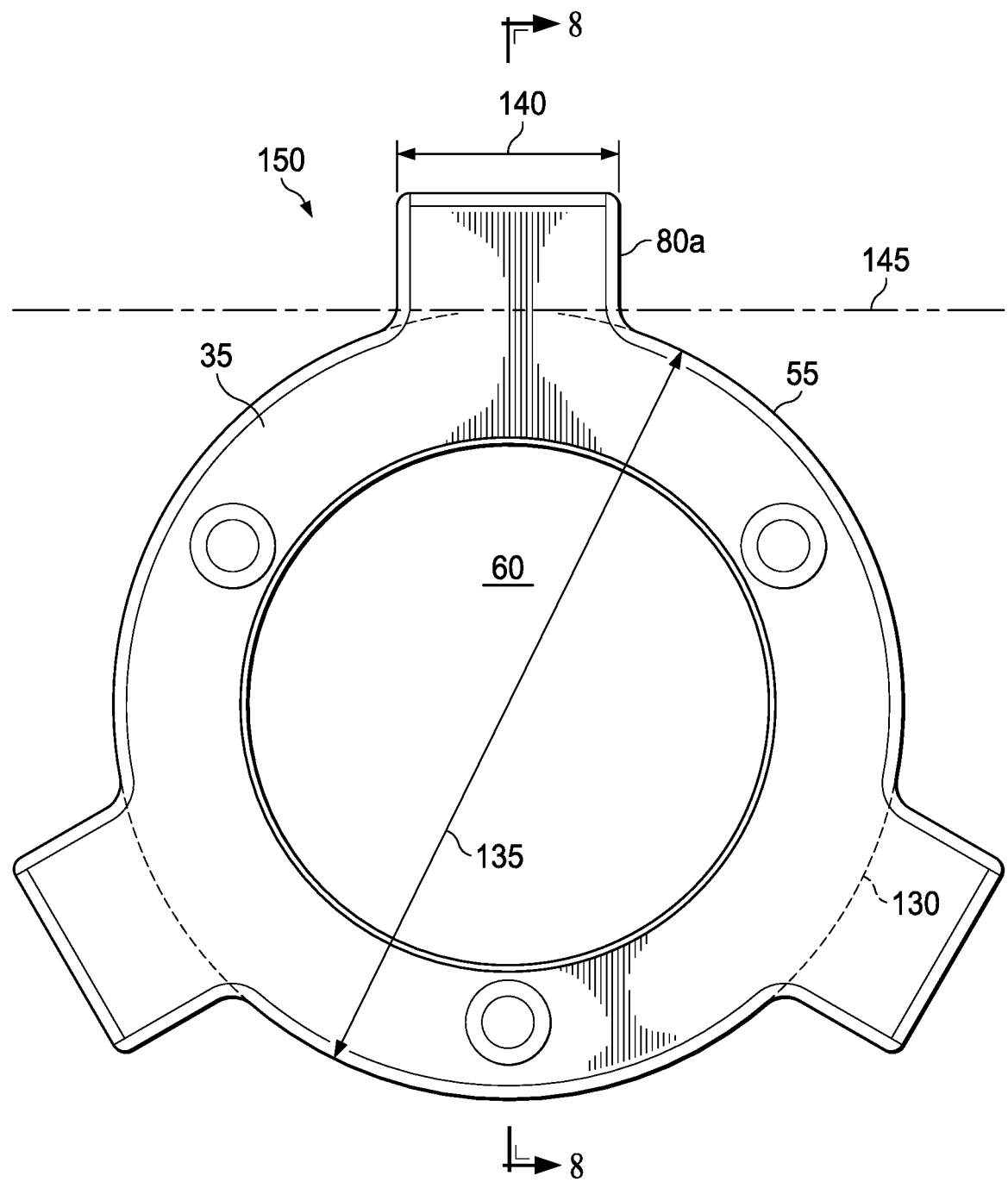
FIG. 7 is a side view of an exemplary embodiment of a wing nut, according to an exemplary embodiment.
Figure 8:
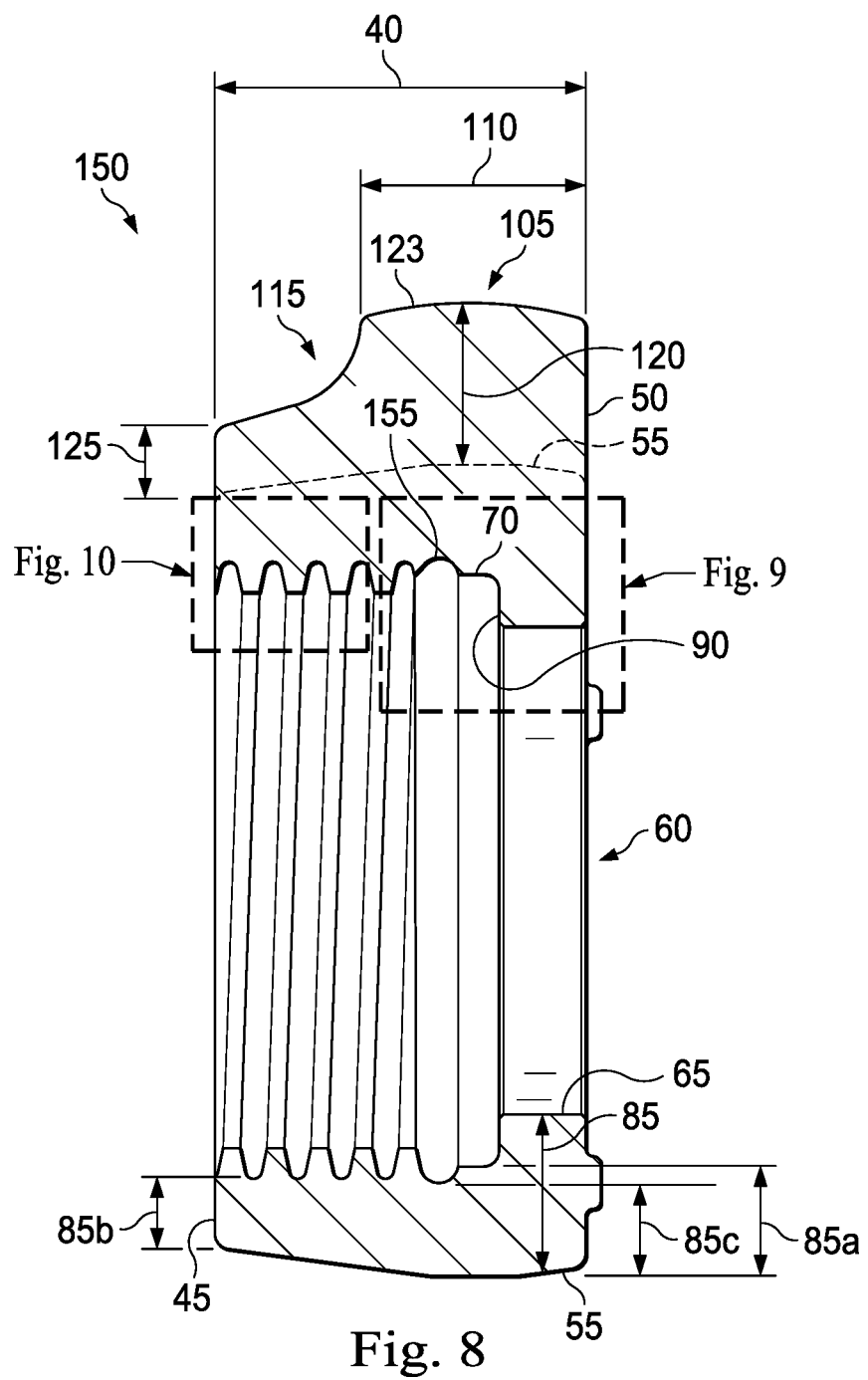
FIG. 8 is a sectional view of the wing nut of FIG. 7, according to an exemplary embodiment, the wing nut including a threaded connection and a double shoulder.
Figure 9:
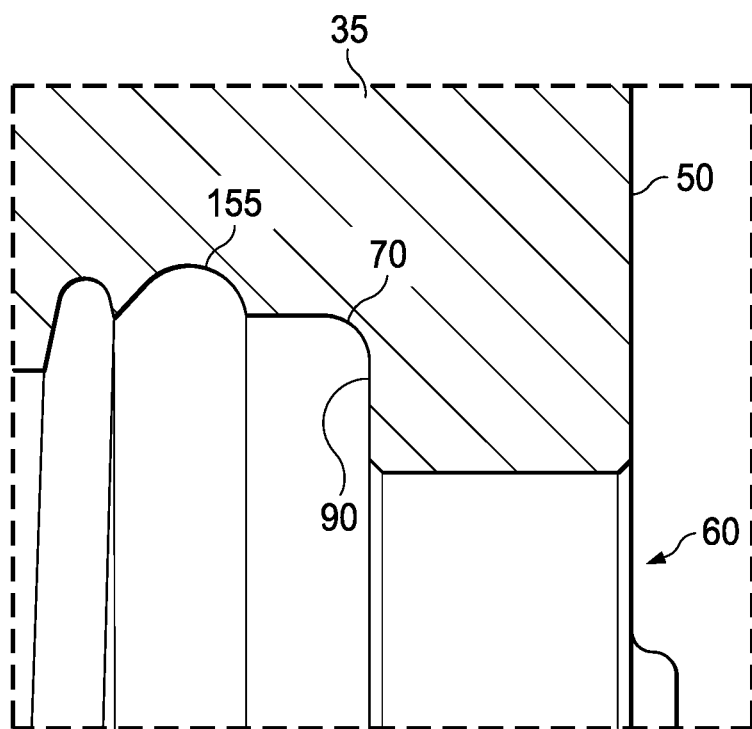
FIG. 9 is an enlarged view of the double shoulder of the wing nut of FIG. 8, according to an exemplary embodiment.
Figure 10:
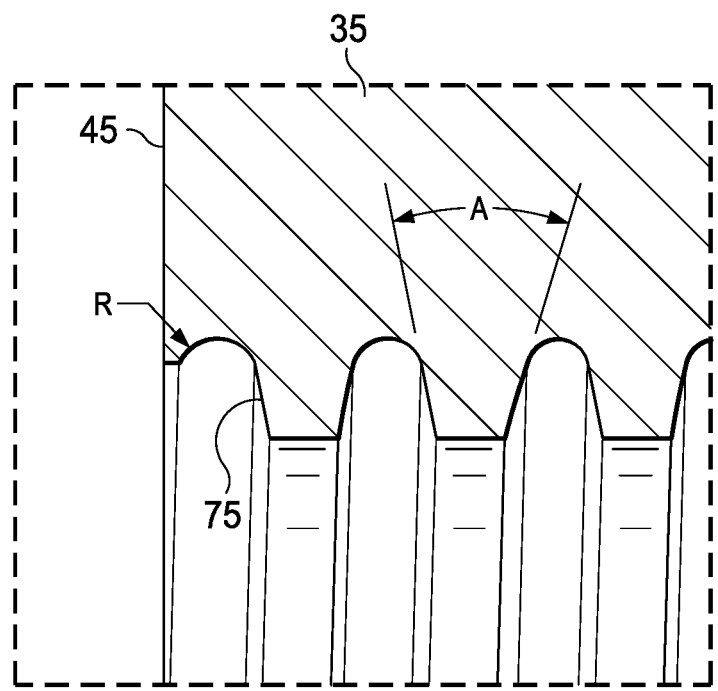
FIG. 10 is an enlarged view of the threaded connection of the wing nut of FIG. 8, according to an exemplary embodiment.
Figure 11:
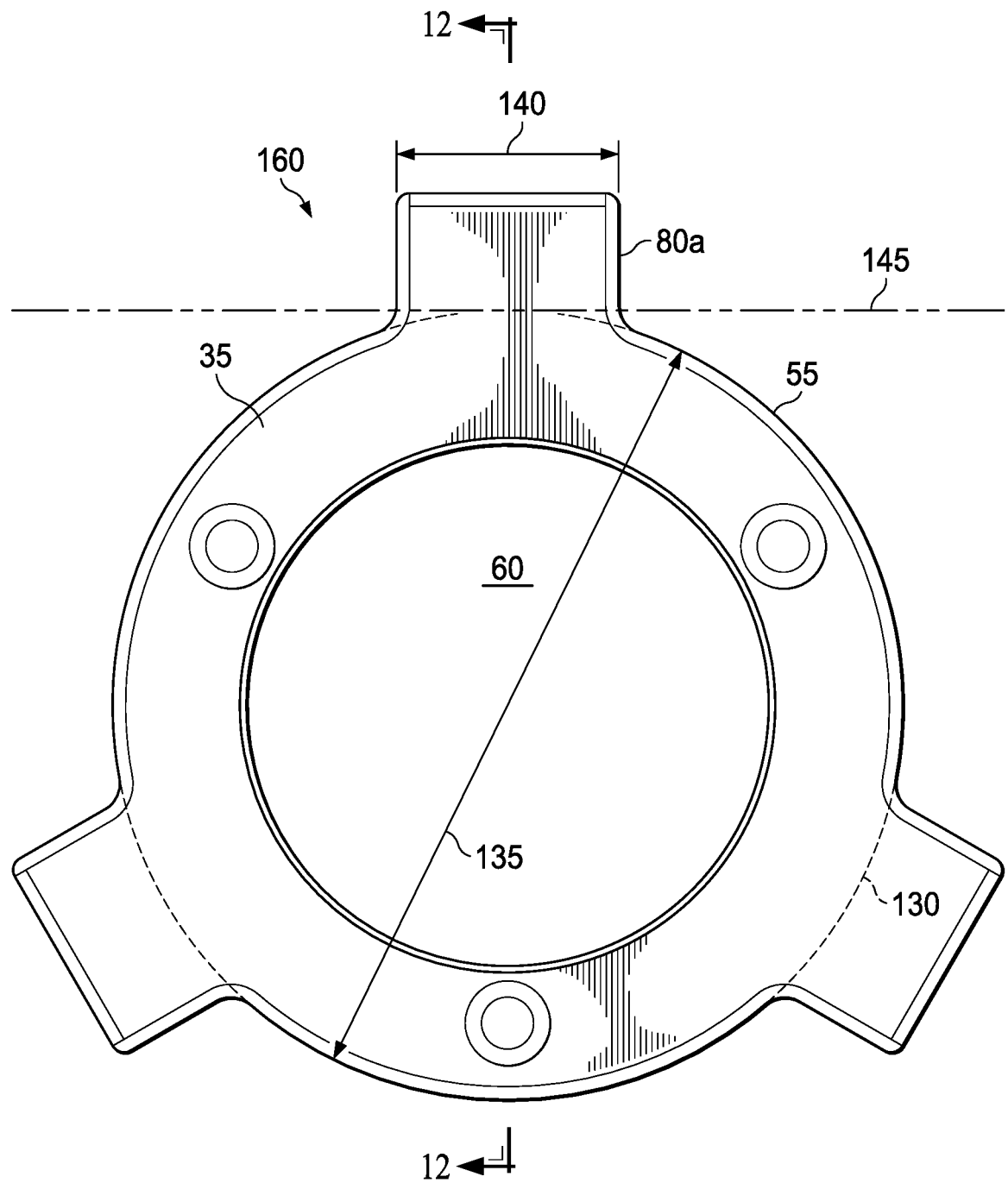
FIG. 11 is a side view of an exemplary embodiment of a wing nut, according to an exemplary embodiment.
Figure 12:
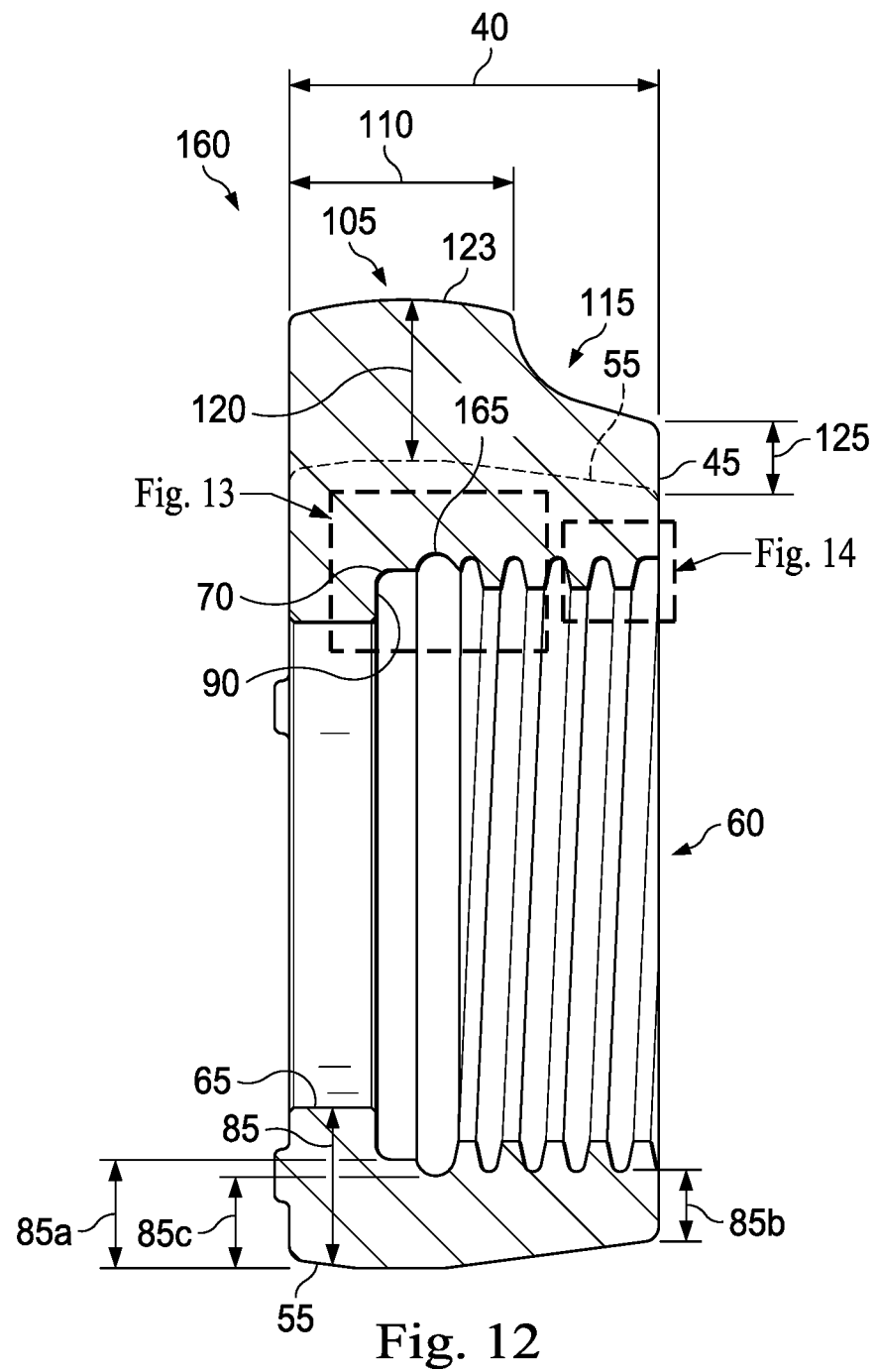
FIG. 12 is a sectional view of the wing nut of FIG. 11, according to an exemplary embodiment, the wing nut including a threaded connection and a double shoulder.
Figure 13:
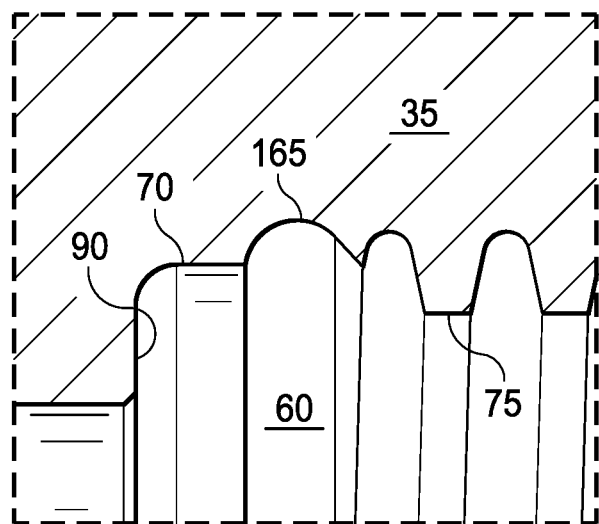
FIG. 13 is an enlarged view of the double shoulder of the wing nut of FIG. 12, according to an exemplary embodiment.
Figure 14:
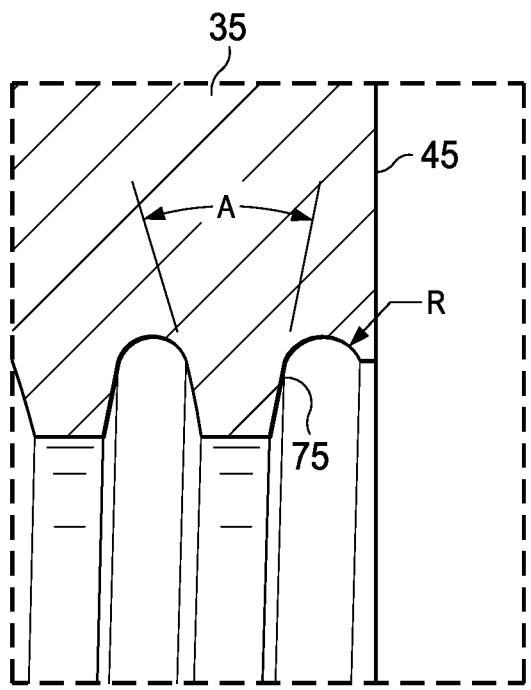
FIG. 14 is an enlarged view of the threaded connection of the wing nut of FIG. 12, according to an exemplary embodiment.
Figure 15:
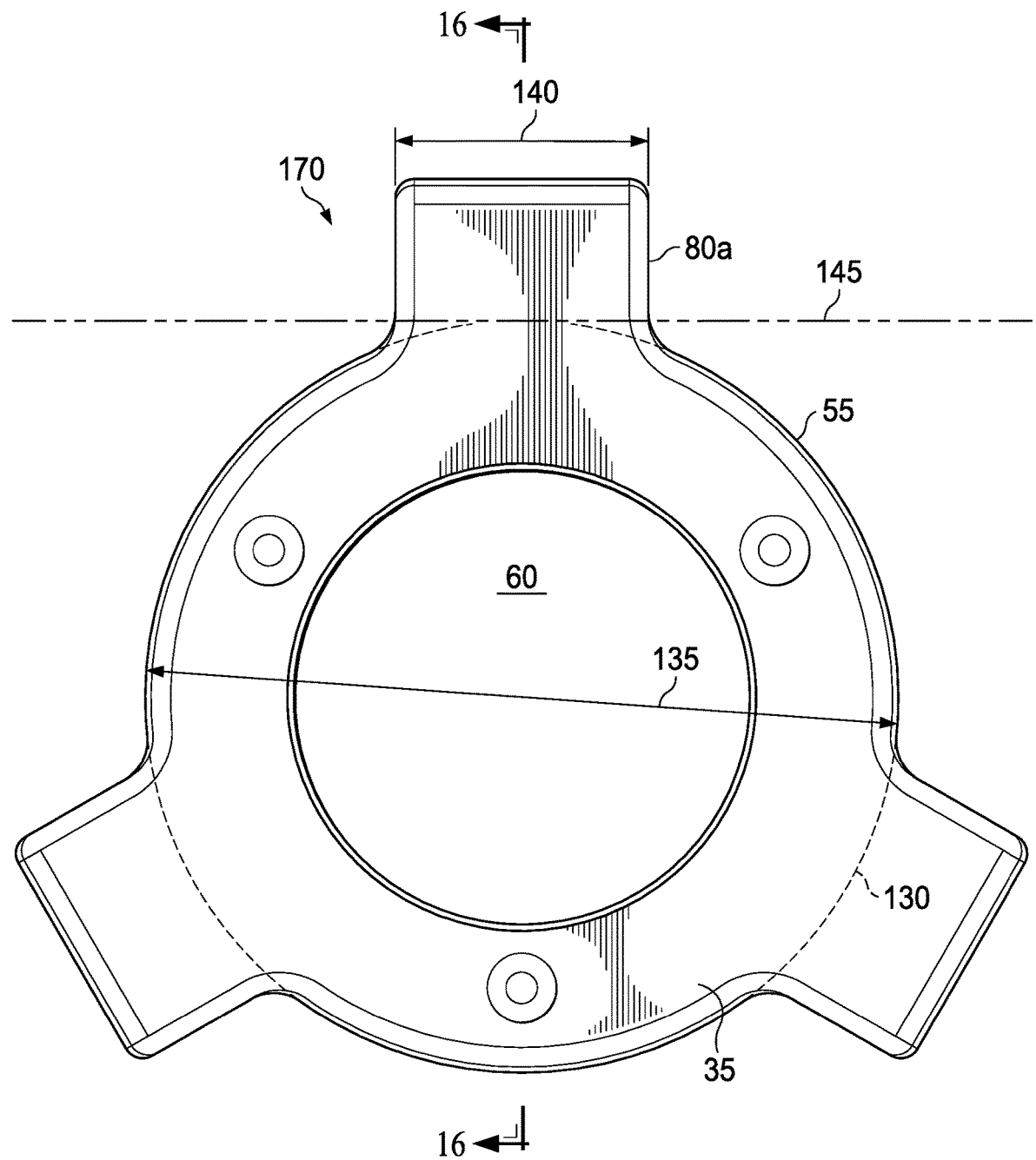
FIG. 15 is a side view of an exemplary embodiment of a wing nut, according to an exemplary embodiment.
Figure 16:
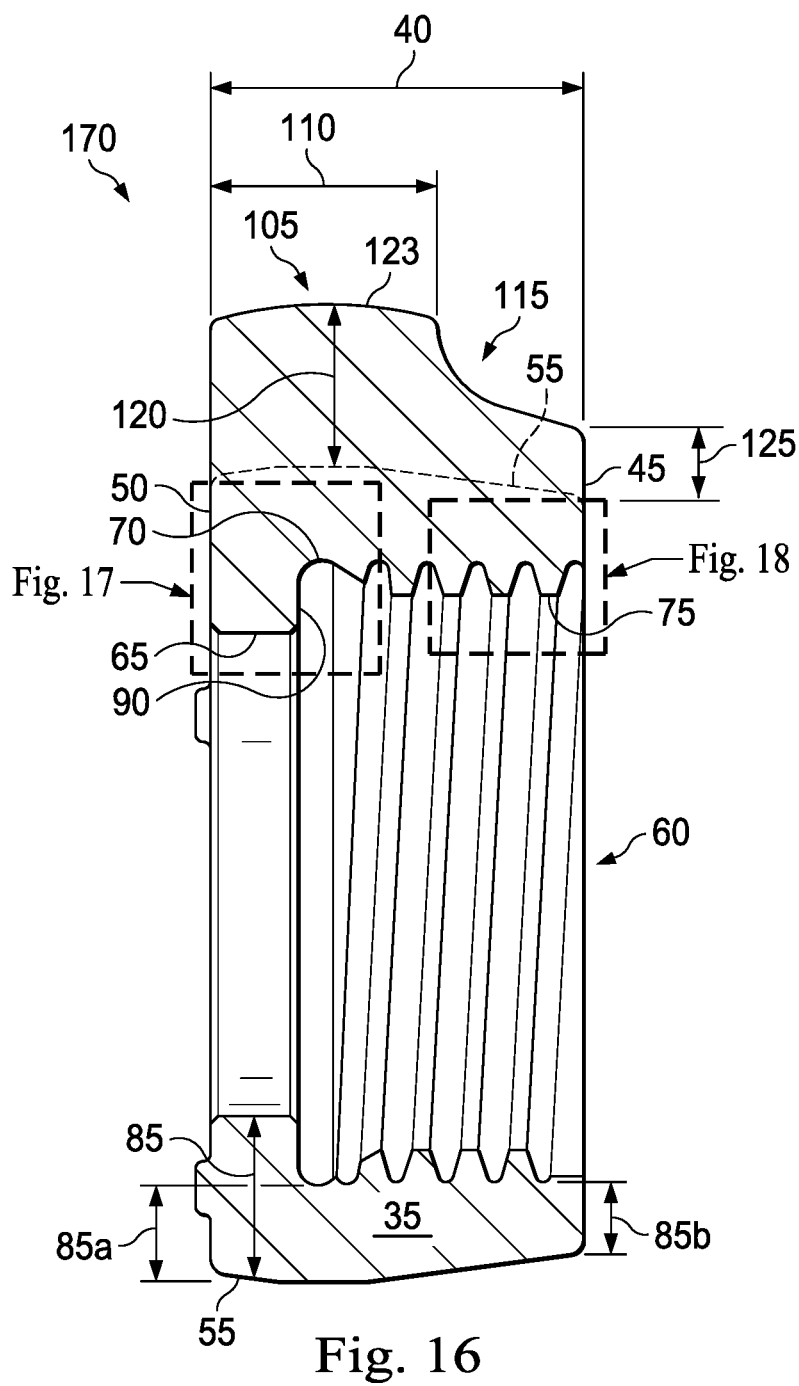
FIG. 16 is a sectional view of the wing nut of FIG. 15, according to an exemplary embodiment, the wing nut including a threaded connection and a shoulder.
Figure 17:
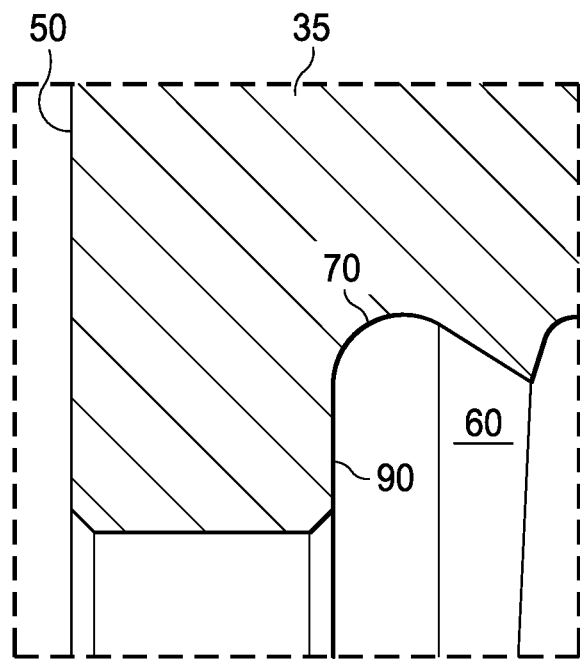
FIG. 17 is an enlarged view of the shoulder of the wing nut of FIG. 16, according to an exemplary embodiment.
Figure 18:
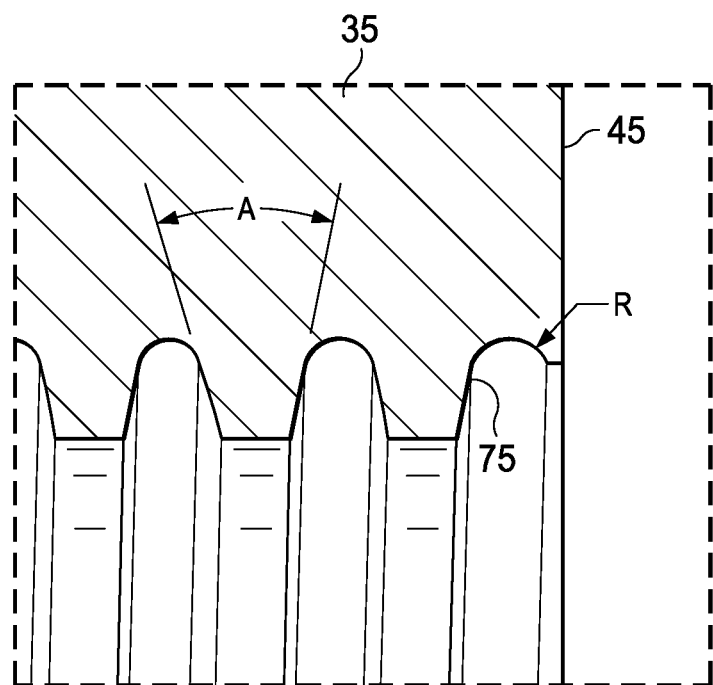
FIG. 18 is an enlarged view of the threaded connection of the wing nut of FIG. 16, according to an exemplary embodiment.
Figure 19:
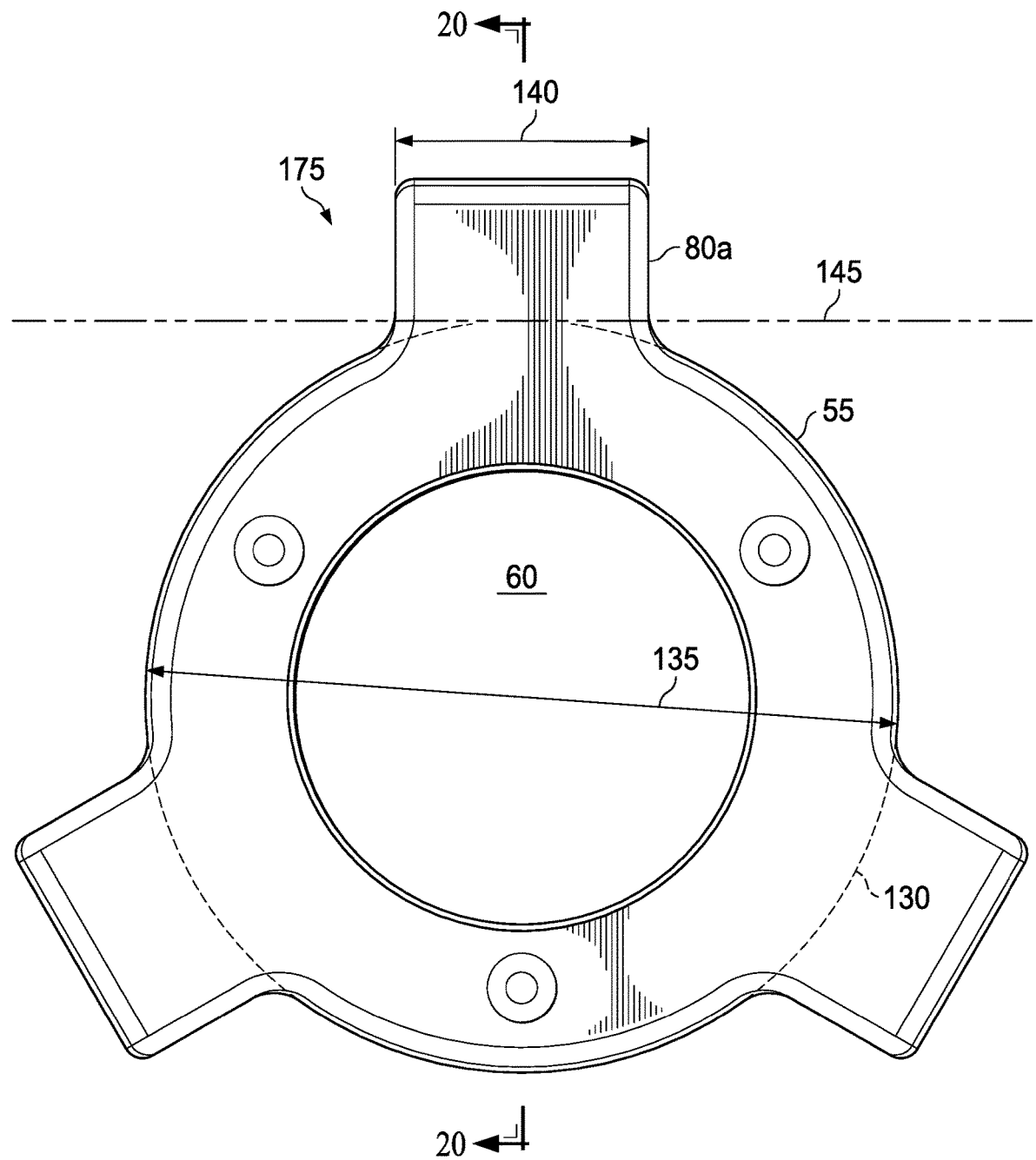
FIG. 19 is a side view of an exemplary embodiment of a wing nut, according to an exemplary embodiment.
Figure 20:
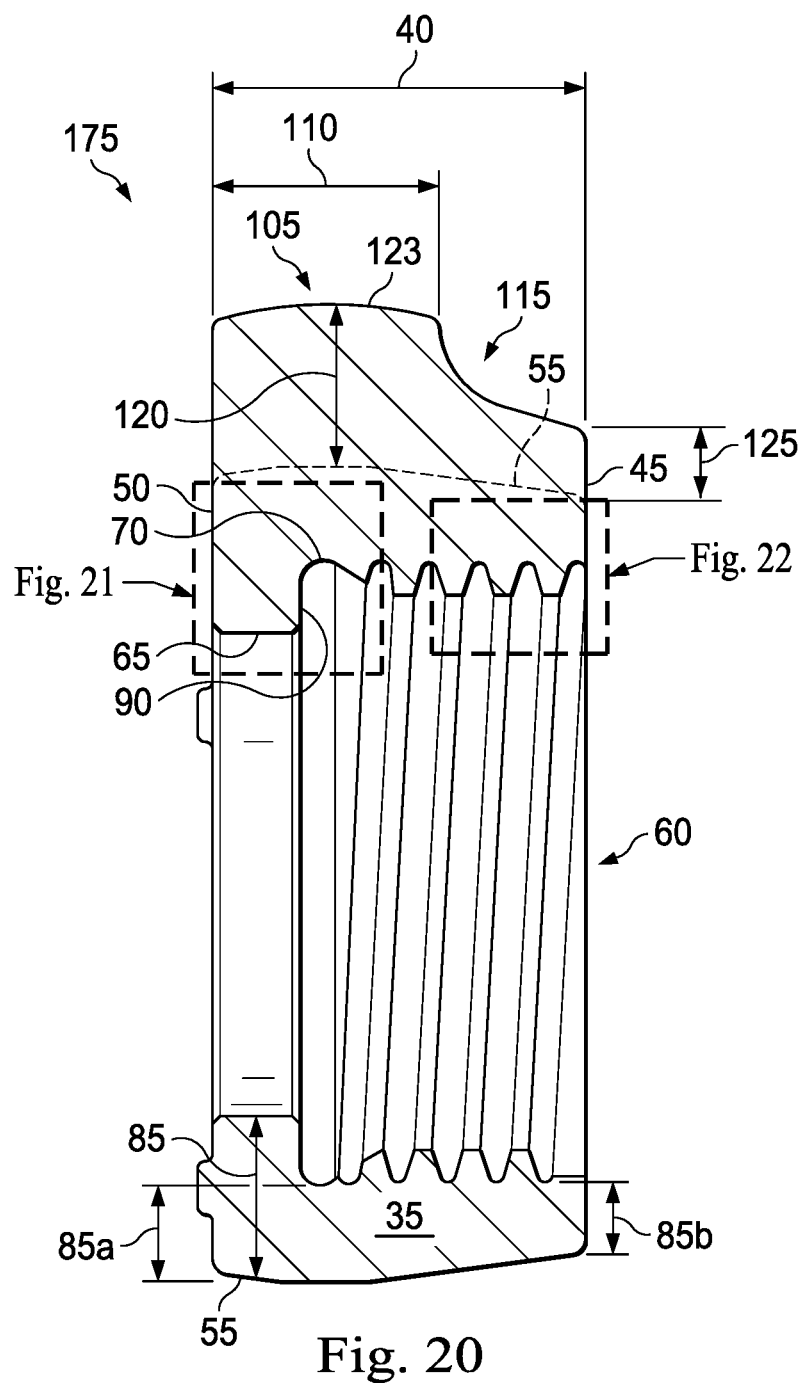
FIG. 20 is a sectional view of the wing nut of FIG. 19, according to an exemplary embodiment, the wing nut including a threaded connection and a shoulder.
Figure 21:
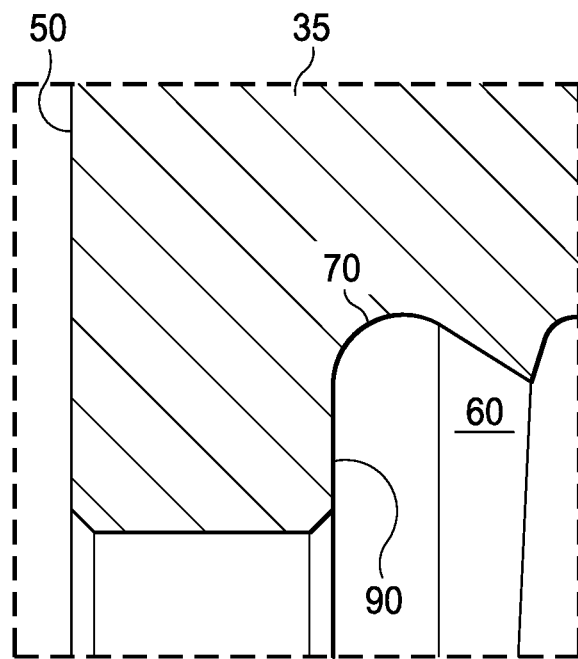
FIG. 21 is an enlarged view of the shoulder of the wing nut of FIG. 19, according to an exemplary embodiment.
Figure 22:
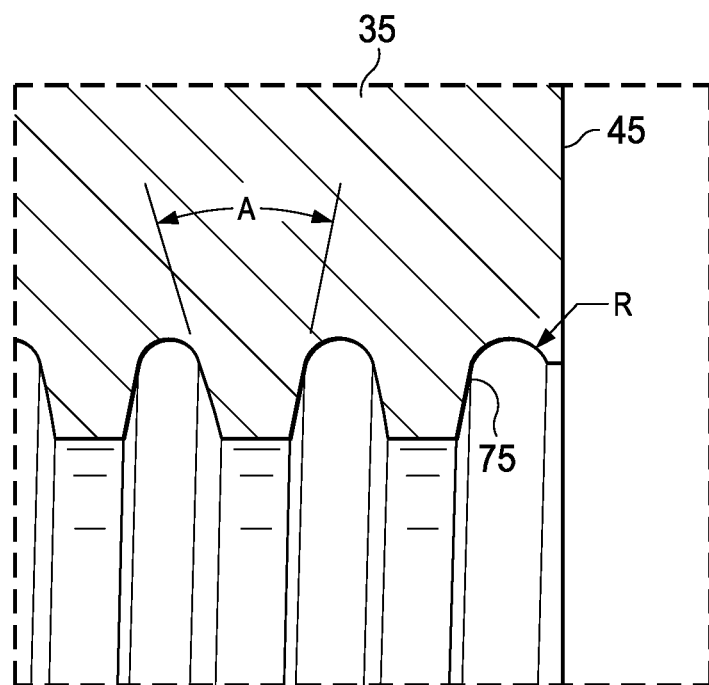
FIG. 22 is an enlarged view of the threaded connection of the wing nut of FIG. 19, according to an exemplary embodiment.
Figure 23:
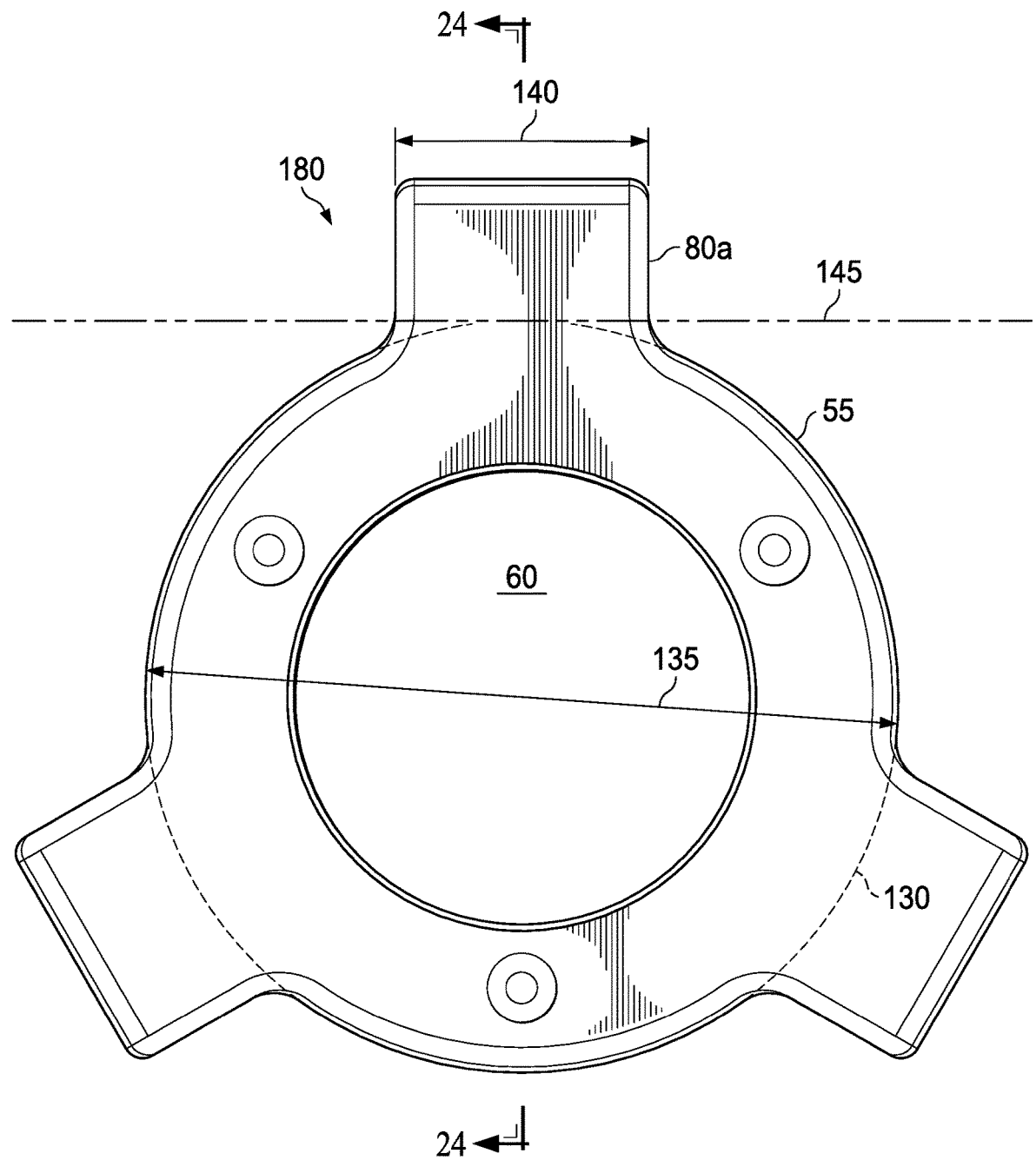
FIG. 23 is a side view of an exemplary embodiment of a wing nut, according to an exemplary embodiment.
Figure 24:
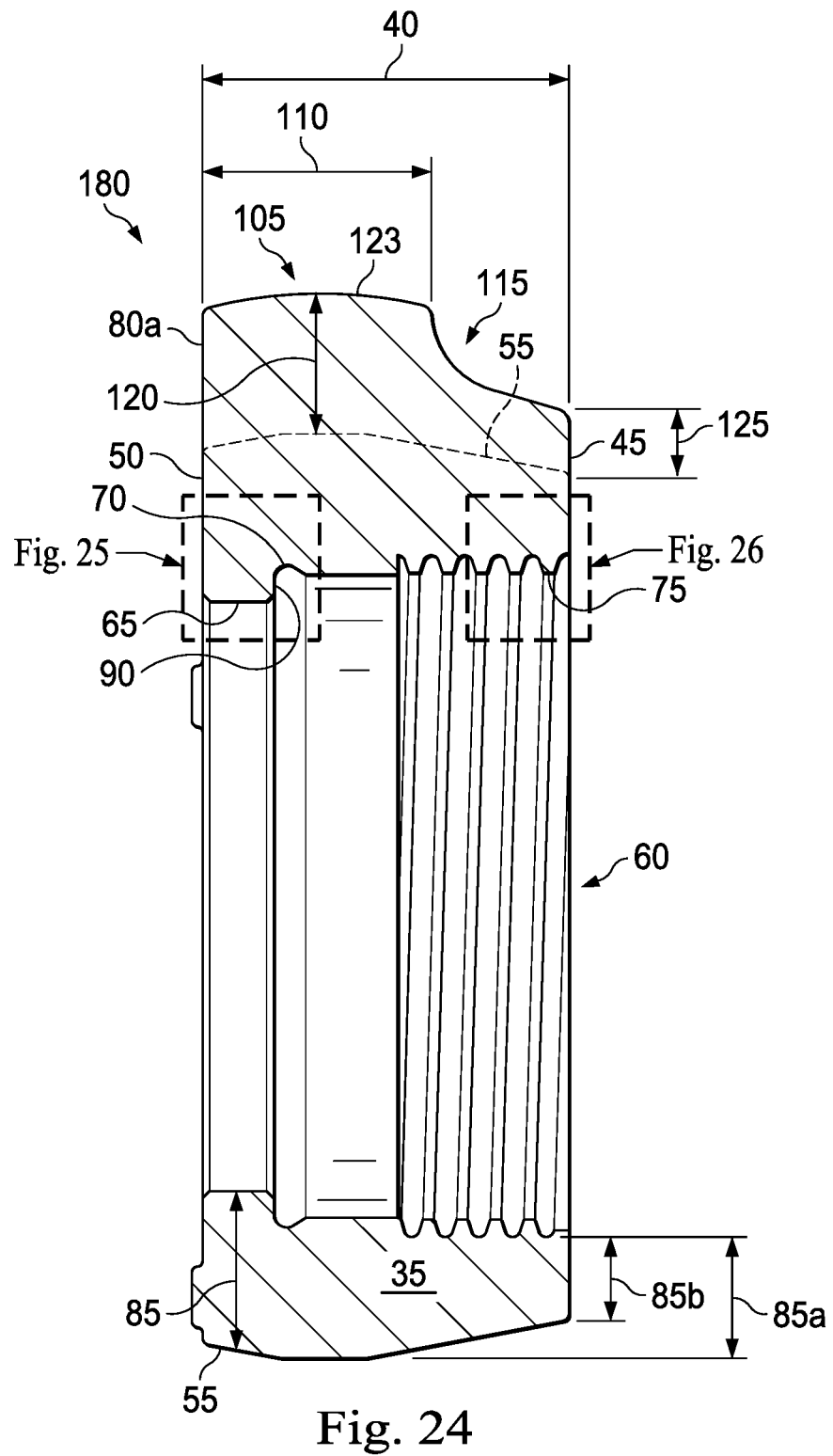
FIG. 24 is a sectional view of the wing nut of FIG. 23, according to an exemplary embodiment, the wing nut including a threaded connection and a shoulder.
Figure 25:
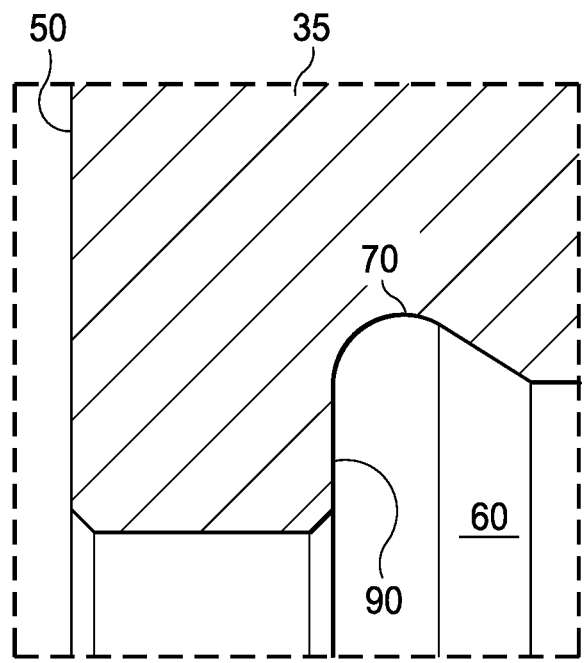
FIG. 25 is an enlarged view of the shoulder of the wing nut of FIG. 24, according to an exemplary embodiment.
Figure 26:
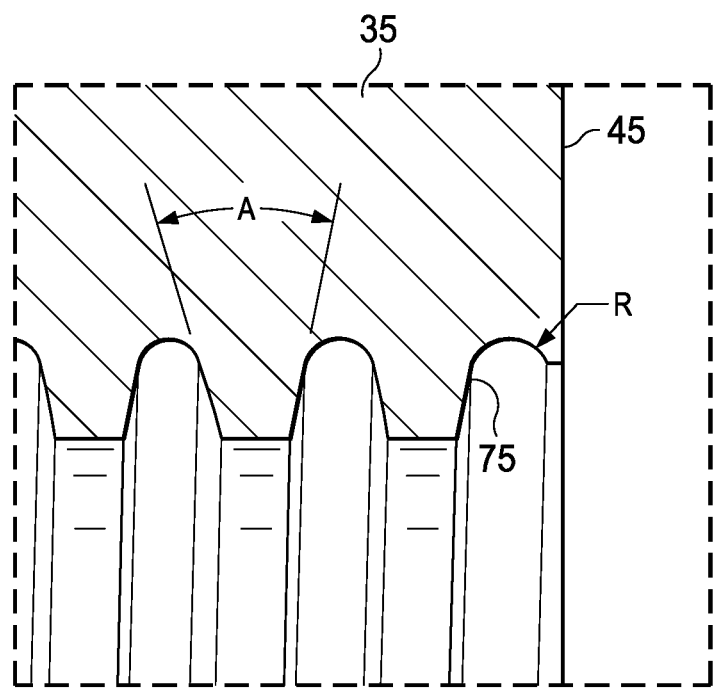
FIG. 26 is an enlarged view of the threaded connection of the wing nut of FIG. 24, according to an exemplary embodiment.
Figure 27:
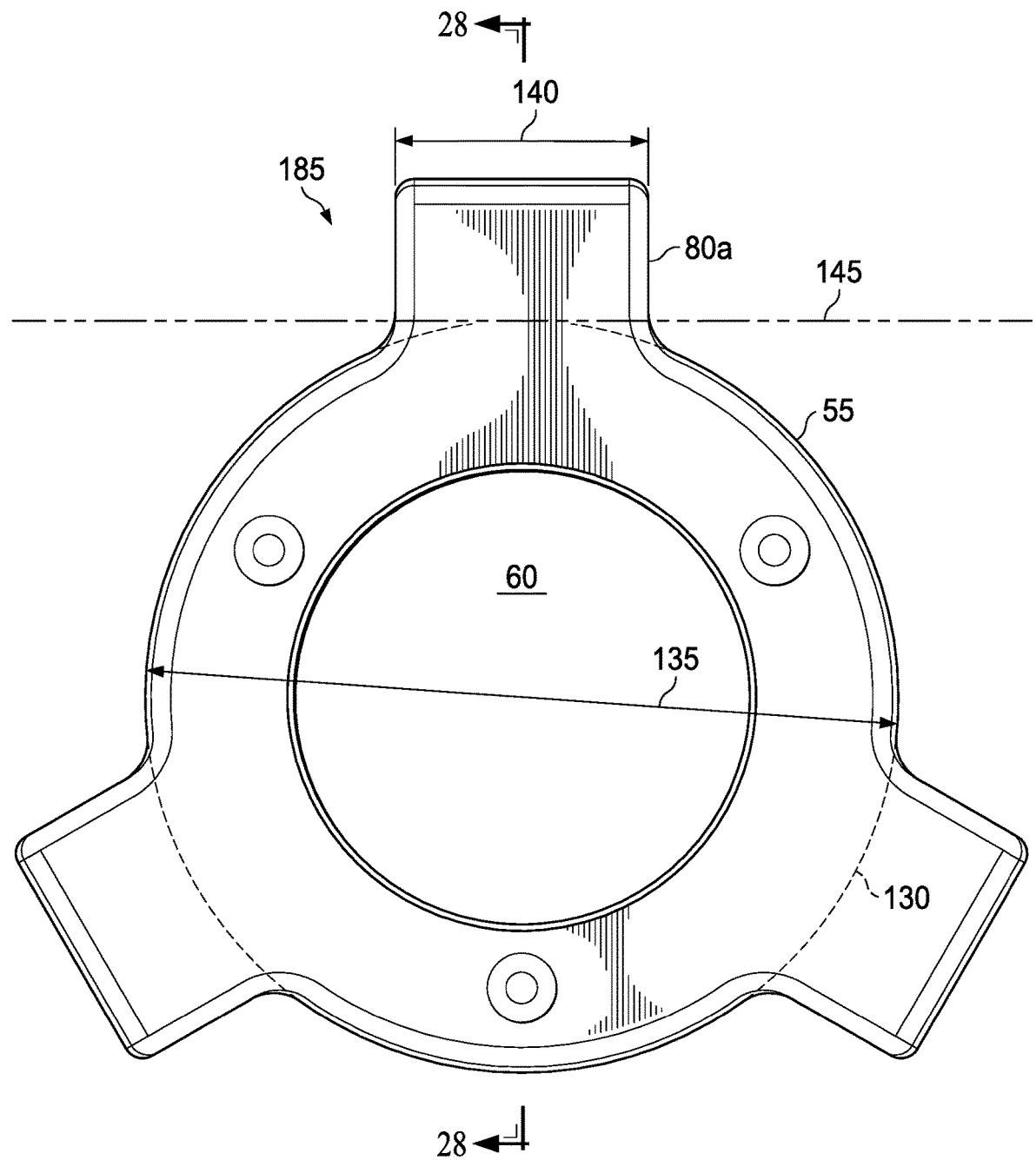
FIG. 27 is a side view of an exemplary embodiment of a wing nut, according to an exemplary embodiment.
Figure 28:
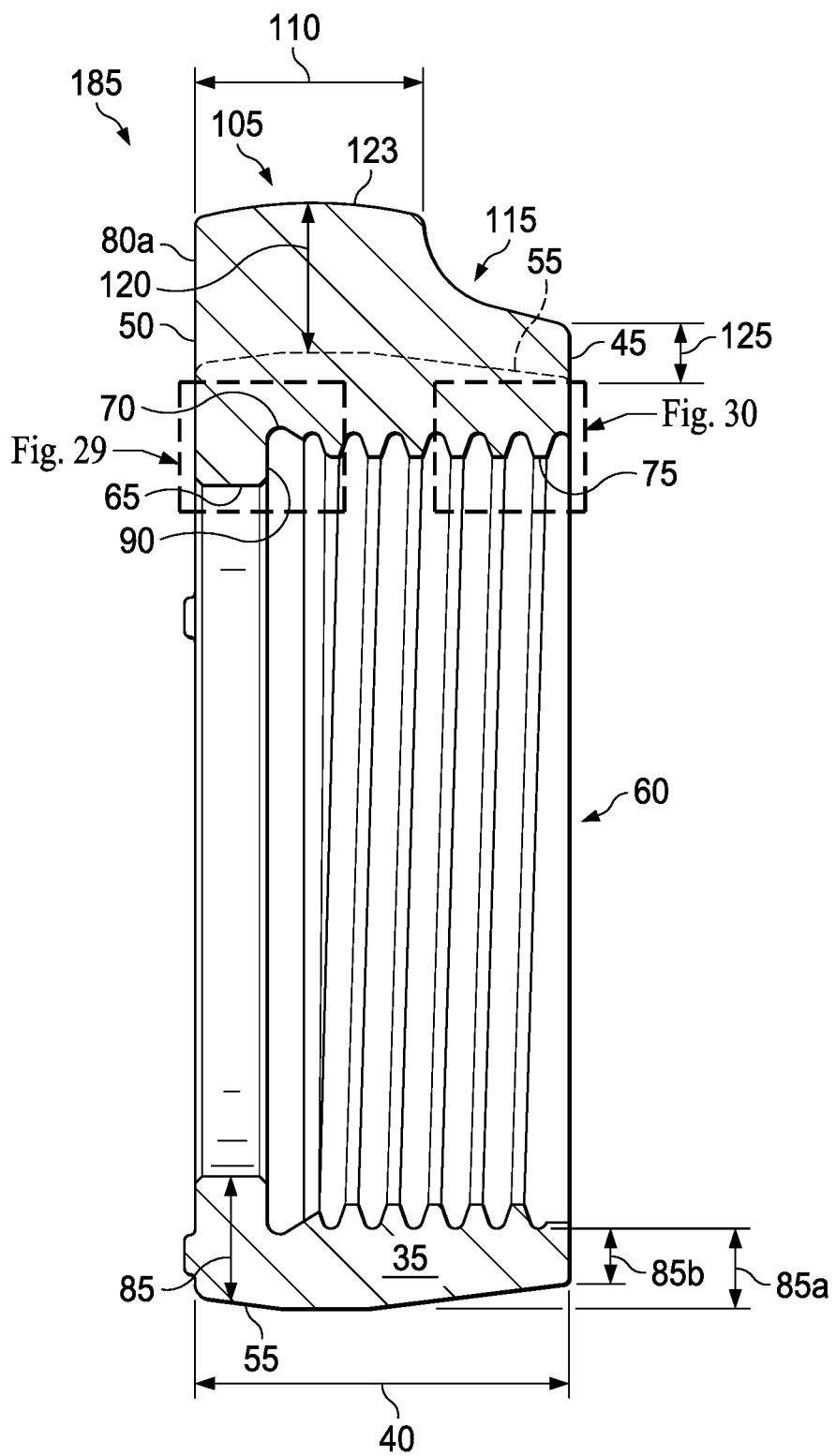
FIG. 28 is a sectional view of the wing nut of FIG. 27, according to an exemplary embodiment, the wing nut including a threaded connection and a shoulder.
Figure 29:
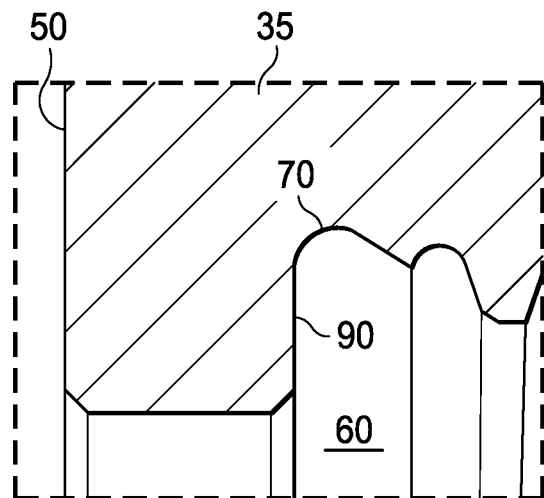
FIG. 29 is an enlarged view of the shoulder of the wing nut of FIG. 28, according to an exemplary embodiment.
Figure 30:
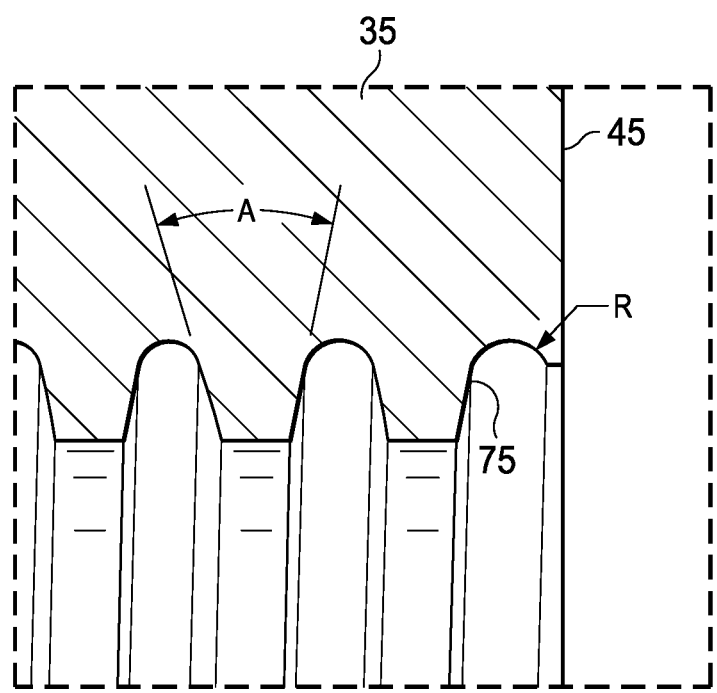
FIG. 30 is an enlarged view of the threaded connection of the wing nut of FIG. 28, according to an exemplary embodiment.
Figure 31:
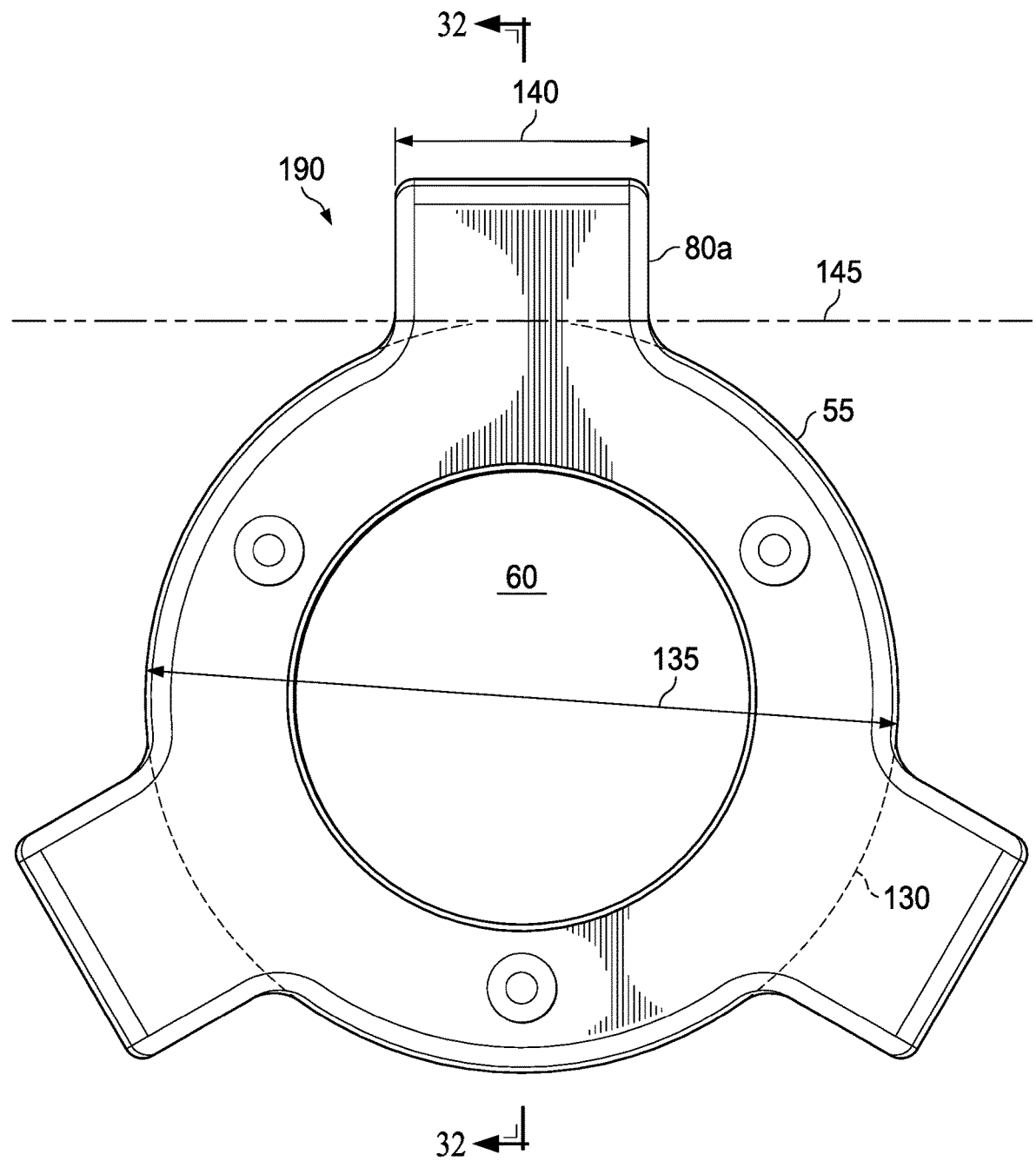
FIG. 31 is a side view of an exemplary embodiment of a wing nut, according to an exemplary embodiment.
Figure 32:
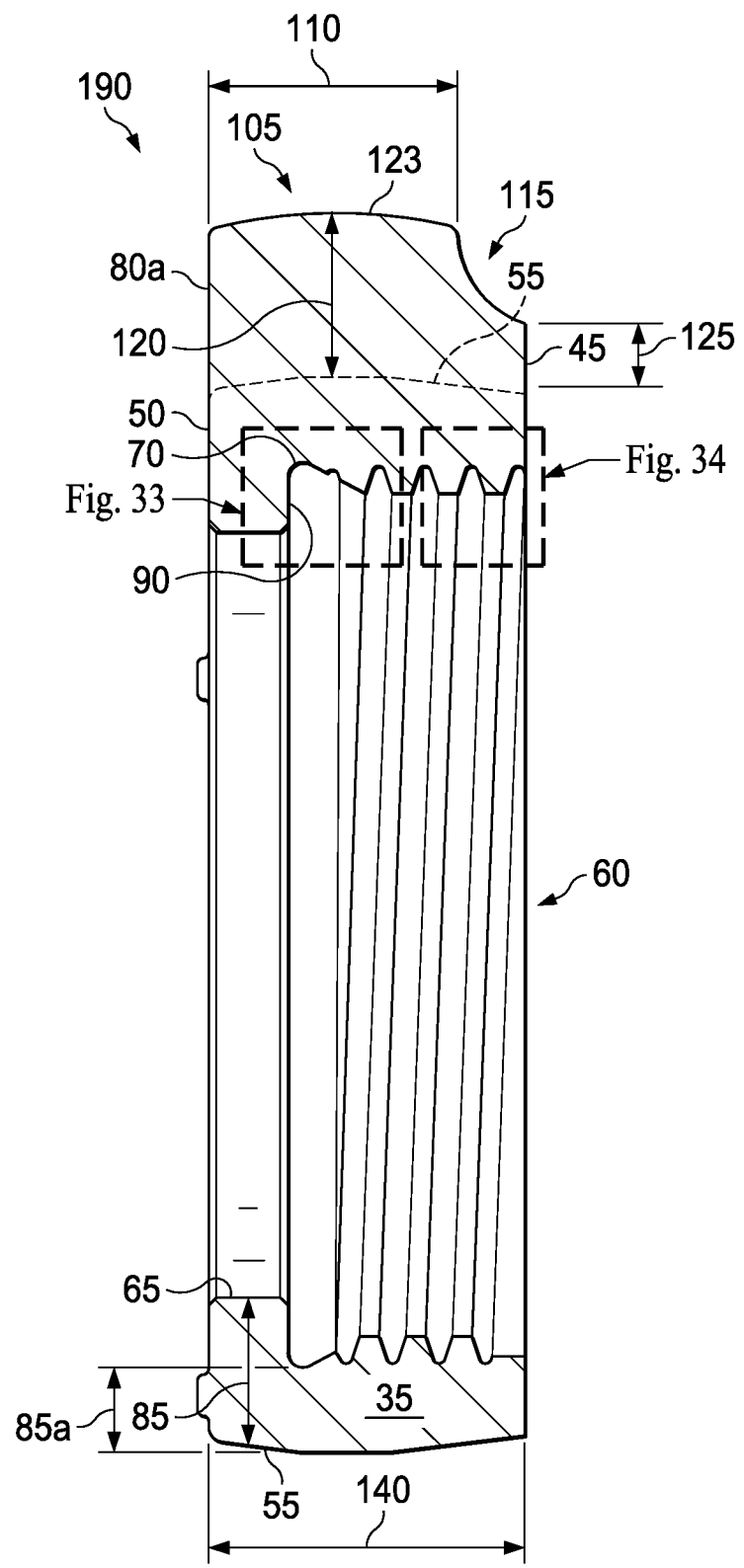
FIG. 32 is a sectional view of the wing nut of FIG. 31, according to an exemplary embodiment, the wing nut including a threaded connection and a shoulder.
Figure 33:
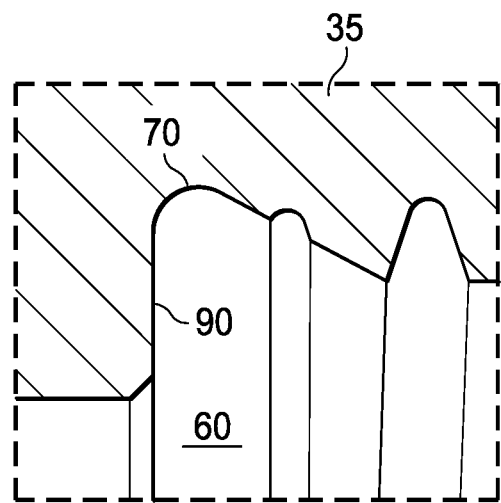
FIG. 33 is an enlarged view of the shoulder of the wing nut of FIG. 32, according to an exemplary embodiment.
Figure 34:
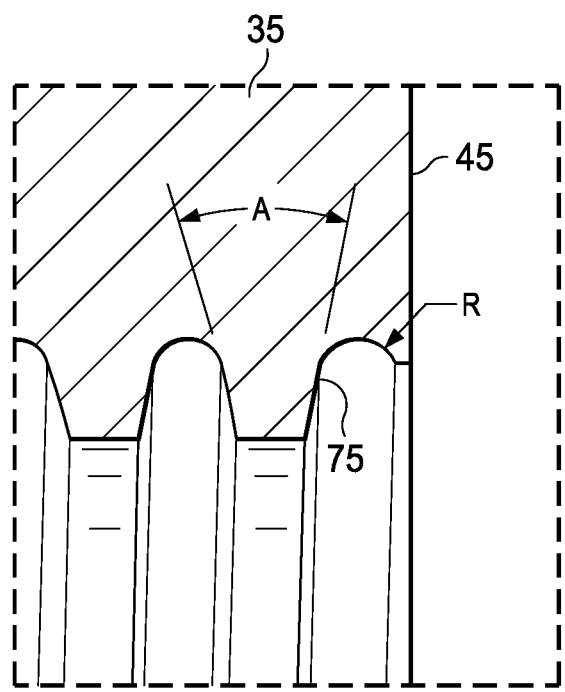
FIG. 34 is an enlarged view of the threaded connection of the wing nut of FIG. 32, according to an exemplary embodiment.

As shown in FIG. 6, and when the wing nut 22 is a three (3) inch wing nut, the internal threaded connection 75 has a full-root radius, as indicated as the radius R on FIG. 6, of 0.053 inches. However, the internal threaded connection 75 may have a full-full root radius of 0.06 inches or 0.07 inches. In an exemplary embodiment, the internal threaded connection 75 has a National Acme Thread Form and thus a pitch angle, as indicated as the angle A in FIG. 6, of 29 degrees. In an exemplary embodiment, the internal threaded connection 75 has a National Acme Thread Form and thus a pitch angle of 29 degrees, and has a full-root radius of 0.053 inches. In an exemplary embodiment, the internal threaded connection 75 having a full-root radius reduces the amount of stress experienced in body of the wing nut 22 near the internal threaded connection 75.

FIGS. 7-10 illustrate an embodiment of a wing nut 150 that is substantially similar to the wing nut 22 and that includes several components of the wing nut 22, which components are given the same reference numerals. In an exemplary embodiment, the wing nut 150 is a three (3) inch nominal pipe size wing nut and includes a second internal shoulder 155 disposed between the threaded connection 75 and the internal shoulder 70. As such, the internal shoulder 155 is formed by the interior surface 65 of the body 35 and defines a portion of the passage 60 that is axially positioned between the internal threaded connection 75 and the internal shoulder 70. Thus, the internal threaded connection 75 formed by the interior surface 65 may extend from the first end surface 45 and towards the internal shoulders 70 and 155. In an exemplary embodiment, the second internal shoulder 155 reduces localized stresses within the wing nut 150 to prevent or at least reduce failure of the wing nut 150. The variable wall thickness 85a of the wing nut 150 at the internal shoulder 70 is about 0.785 inches and the variable wall thickness 85b at or near the first surface 45 is about 0.568 inches. Additionally, a variable wall thickness 85c at the second internal shoulder 155 is about 0.68 inches. Additionally, the axial length 40 of the body 35 is about 2.75 inches and the first portion length 110 is about 1.75 such that the ratio of the axial length 40 to the first portion length 110 is about 1.57. In an exemplary embodiment, the thickness 120 is about 1.05 and the thickness 125 at the first end surface 45 is about 0.48 inches. In an exemplary embodiment, the outer diameter 135 of the body 35 is about 6.9 inches and the width 140 of the lug 80a is about 1.94 inches such that the ratio of the outer diameter 135 to the width 140 of the lug 80a is about 3.55. Moreover, the internal threaded connection 75 has a full-root radius, as indicated as the radius R on FIG. 10, of 0.05 inches. In an exemplary embodiment, the internal threaded connection 75 has a National Acme Thread Form and thus a pitch angle, as indicated as the angle A in FIG. 10, of 29 degrees.

FIGS. 11-14 illustrate an embodiment of a wing nut 160 that is substantially similar to the wing nut 22 and that includes several components of the wing nut 22, which components are given the same reference numerals. In an exemplary embodiment, the wing nut 160 is a three (3) inch nominal pipe size wing nut and includes a second internal shoulder 165 disposed between the threaded connection 75 and the internal shoulder 70. As such, the internal shoulder 165 is formed by the interior surface 65 of the body 35 and defines a portion of the passage 60 that is axially positioned between the internal threaded connection 75 and the internal shoulder 70. Thus, the internal threaded connection 75 formed by the interior surface 65 may extend from the first end surface 45 and towards the internal shoulders 70 and 165. In an exemplary embodiment, the second internal shoulder 165 reduces localized stresses within the wing nut 160 to prevent or at least reduce failure of the wing nut 160. The variable wall thickness 85a of the wing nut 160 at the internal shoulder 70 is about 0.785 inches and the variable wall thickness 85b at or near the first surface 45 is about 0.54 inches. Additionally, the variable wall thickness 85c at the second internal shoulder 165 is about 0.68 inches. Additionally, the axial length 40 of the body 35 is about 2.75 inches and the first portion length 110 is about 1.75 such that the ratio of the axial length 40 to the first portion length 110 is about 1.57. In an exemplary embodiment, the thickness 120 is about 1.05 and the thickness 125 is about 0.48 inches. In an exemplary embodiment, the outer diameter 135 of the body 35 is about 6.9 inches and the width 140 of the lug 80a is about 1.94 inches such that the ratio of the outer diameter 135 to the width 140 of the lug 80a is about 3.55. Moreover, the internal threaded connection 75 has a full-root radius, as indicated as the radius R on FIG. 14, of 0.05 inches. In an exemplary embodiment, the internal threaded connection 75 has a National Acme Thread Form and thus a pitch angle, as indicated as the angle A in FIG. 14, of 29 degrees.

FIGS. 15-18 illustrate an embodiment of a wing nut 170 that is substantially similar to the wing nut 22 and that includes several components of the wing nut 22, which components are given the same reference numerals. In an exemplary embodiment, the wing nut 170 is a two (2) inch nominal pipe size wing nut and the variable wall thickness 85a at the internal shoulder is about 0.67 inches and the variable wall thickness 85b at or near the first end surface 45 is about 0.44 inches. Additionally, the axial length 40 of the body 35 is about 2.53 inches and the first portion length 110 is about 1.5 such that the ratio of the axial length 40 to the first portion length 110 is about 1.68. In an exemplary embodiment, the thickness 120 is about 1.06 and the thickness 125 at the first end surface 45 is about 0.42 inches. In an exemplary embodiment, the outer diameter 135 of the body 35 is about 5.6 inches and the width 140 of the lug 80a is about 1.88 inches such that the ratio of the outer diameter 135 to the width 140 of the lug 80a is about 2.97. Moreover, the internal threaded connection 75 has a full-root radius, as indicated as the radius R on FIG. 18, of 0.06 inches. In an exemplary embodiment, the internal threaded connection 75 has a National Acme Thread Form and thus a pitch angle, as indicated as the angle A in FIG. 18, of 29 degrees.

FIGS. 19-23 illustrate an embodiment of a wing nut 175 that is substantially similar to the wing nut 22 and that includes several components of the wing nut 22, which components are given the same reference numerals. In an exemplary embodiment, the wing nut 175 is a two (2) inch nominal pipe size wing nut and the variable wall thickness 85a at the internal shoulder is about 0.67 inches and the variable wall thickness 85b at or near the first end surface 45 is about 0.44 inches. Additionally, the axial length 40 of the body 35 is about 2.53 inches and the first portion length 110 is about 1.5 such that the ratio of the axial length 40 to the first portion length 110 is about 1.68. In an exemplary embodiment, the thickness 120 is about 1.06 and the thickness 125 at the first end surface 45 is about 0.42 inches. In an exemplary embodiment, the outer diameter 135 of the body 35 is about 5.6 inches and the width 140 of the lug 80a is about 1.88 inches such that the ratio of the outer diameter 135 to the width 140 of the lug 80a is about 2.97. Moreover, the internal threaded connection 75 has a full-root radius, as indicated as the radius R on FIG. 22, of 0.06 inches. In an exemplary embodiment, the internal threaded connection 75 has a National Acme Thread Form and thus a pitch angle, as indicated as the angle A in FIG. 22, of 29 degrees.

FIGS. 23-26 illustrate an embodiment of a wing nut 180 that is substantially similar to the wing nut 22 and that includes several components of the wing nut 22, which components are given the same reference numerals. In an exemplary embodiment, the wing nut 180 is a four (4) inch nominal pipe size wing nut and the variable wall thickness 85a at the internal shoulder is about 1.31 inches and the variable wall thickness 85b at or near the first end surface 45 is about 0.94 inches. In an exemplary embodiment, the axial length 40 of the body 35 is about 3.63 inches and the first portion length 110 is about 2.25 such that the ratio of the axial length 40 to the first portion length 110 is about 1.61. In an exemplary embodiment, the thickness 120 is about 1.375 inches. In an exemplary embodiment, the thickness 125 at the first end surface 45 is about 0.588 inches. In an exemplary embodiment the outer diameter 135 of the body 35 is about 9.25 inches and the width 140 of the lug 80a is about two (2) inches such that the ratio of the outer diameter 135 to the width 140 of the lug 80a is about 4.6. Moreover, the internal threaded connection 75 has a full-root radius, as indicated as the radius R on FIG. 26, of 0.07 inches. In an exemplary embodiment, the internal threaded connection 75 has a National Acme Thread Form and thus a pitch angle, as indicated as the angle A in FIG. 26, of 29 degrees.

FIGS. 27-30 illustrate an embodiment of a wing nut 185 that is substantially similar to the wing nut 22 and that includes several components of the wing nut 22, which components are given the same reference numerals. In an exemplary embodiment, the wing nut 185 is a four (4) inch nominal pipe size wing nut the variable wall thickness 85a at the internal shoulder is about 0.605 inches and the variable wall thickness 85b at or near the first end surface 45 is about 0.4 inches. In some exemplary embodiments, the width 140 of the lug 80a may be about 2.13 inches and the outer diameter 135 of the body 35 is about 7.66 inches such that the ratio of the outer diameter 135 to the width 140 is about 3.59. In an exemplary embodiment, the thickness 120 is about 1.17 inches. In an exemplary embodiment, the thickness 125 is about 0.375 inches. In an exemplary embodiment, the axial length 40 of the body 35 is about 3 inches and the first portion length 110 is about 1.75 such that the ratio of the length 40 to the first portion length 110 is about 1.7. Moreover, the internal threaded connection 75 has a full-root radius, as indicated as the radius R on FIG. 30, of 0.07 inches. In an exemplary embodiment, the internal threaded connection 75 has a National Acme Thread Form and thus a pitch angle, as indicated as the angle A in FIG. 30, of 29 degrees.

FIGS. 31-34 illustrate an embodiment of a wing nut 190 that is substantially similar to the wing nut 22 and that includes several components of the wing nut 22, which components are given the same reference numerals. In an exemplary embodiment, the wing nut 190 is a four (4) inch nominal pipe size wing nut the variable wall thickness 85a at the internal shoulder is about 0.605 inches. In some exemplary embodiments, the width 140 of the lug 80a may be about 2.13 inches and the outer diameter 135 of the body 35 is about 7.66 inches such that the ratio of the outer diameter 135 to the width 140 is about 3.59. In an exemplary embodiment, the thickness 120 is about 1.17 inches. In an exemplary embodiment, the axial length 40 of the body 35 is about 2.25 inches and the first portion length 110 is about 1.75 such that the ratio of the length 40 to the first portion length 110 is about 1.28. Moreover, the internal threaded connection 75 has a full-root radius, as indicated as the radius R on FIG. 34, of 0.07 inches. In an exemplary embodiment, the internal threaded connection 75 has a National Acme Thread Form and thus a pitch angle, as indicated as the angle A in FIG. 34, of 29 degrees.

In an exemplary embodiment, the lugs 80a, 80b, and 80c extending along the axial length 40 of the body 35 increases the durability of the wing nuts 22, 150, 160, 170, 175, 180, 185, and 190 and the hammer union 10. Additionally, the lugs 80a, 80b, and 80c having a length that is equal to or substantially equal to (within 10%) of the axial length 40 of the body 35 increases the surface area on which a sledgehammer or other tool may contact the wing nuts 22, 150, 160, 170, 175, 180, 185, and 190 when the hammer union 10 is assembled. Additionally, the thickness and shape of the lugs 80a, 80b, 80c, each of which is described as the outer surface extending along the axial length 40 of the body 35, may increase the number of cycles before the wing nuts 22, 150, 160, 170, 175, 180, 185, and 190 are fatigued, or may increase the fatigue life.

In an exemplary embodiment, the hammer union 10 is available in a wide range of sizes and in working pressures to 20,000 psi or even 30,000 psi. In an exemplary embodiment, the hammer union 10 provides a pressure-tight, positive seal and is available for standard service and sour gas models. In an exemplary embodiment, the hammer union 10 is used to connect two flow line components in a variety of well service applications, such as for example to connect two flow line components within a hydraulic frac system. However, the hammer union 10 may be used with cementing trucks, a variety of different manifolds (fixed, etc.), a variety of different trailers (e.g., missile, manifold), and high pressure equipment, such as equipment within a hydraulic frac system.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A wing nut for an oilfield equipment hammer union, the wing nut comprising:
   a body having an axial length defined between first and second end surfaces, the body having an exterior surface extending between the first and second end surfaces;
   a passage axially extending through the body from the first end surface to the second end surface, wherein the passage defines an interior surface of the body;
   an internal threaded connection formed by the interior surface of the body and defining a portion of the passage, wherein the internal threaded connection includes a full-root radius, wherein when the wing nut is a three inch nominal pipe size wing nut, the full-root radius is from 0.05 inches to 0.07 inches; and
   a plurality of circumferentially-spaced lugs extending radially from the exterior surface of the body;
   wherein a first lug of the plurality of lugs has radially-extending side walls configured to receive forces used to tighten and loosen the wing nut.

2. The wing nut of claim 1, wherein the first lug extending along an entirety of the axial length of the body increases a durability of the wing nut.

3. The wing nut of claim 1,
   wherein the exterior surface of the body defines an outer circumference and an outer diameter;
   wherein the first lug of the plurality of lugs defines a width measured along a line that is tangential to the outer circumference of the body; and
   wherein a ratio of the outer diameter of the body to the width of the first lug is between about 2.5 and about 5.5.

4. The wing nut of claim 3,
   wherein the outer diameter of the body is about seven inches; and
   wherein the width of the first lug is about two inches such that the ratio of the outer diameter of the body to the width of the first lug is about 3.5.

5. The wing nut of claim 1,
   wherein the internal threaded connection of the wing nut is adapted to engage a corresponding external threaded connection of a female sub to couple the female sub to a male sub and at least partially form the hammer union.

6. The wing nut of claim 1, wherein the internal threaded connection has a pitch angle of 29 degrees.

7. The wing nut of claim 1, being configured for coupling with a retainer ring having a plurality of retainer segments concentrically disposed about a male sub of the hammer union, wherein the plurality of retainer segments is radially positioned between the male sub and the wing nut such that the wing nut is concentrically disposed about the male sub and the interior surface of the body of the wing nut is spaced radially from the male sub.

8. The wing nut of claim 1, further comprising:
   a first internal shoulder formed by the interior surface of the body and defining another portion of the passage.

9. The wing nut of claim 8, wherein the body has a variable wall thickness defined between the interior surface of the body and the exterior surface of the body.

10. The wing nut of claim 9, wherein the variable wall thickness at the second end surface is greater than the variable wall thickness at the first end surface.

11. The wing nut of claim 9, wherein the variable wall thickness at the first internal shoulder is greater than the variable wall thickness at the first end surface.

12. The wing nut of claim 11, wherein the variable wall thickness at the first internal shoulder being greater than the variable wall thickness at the first end surface results in an increased rigidity of the body.

13. The wing nut of claim 9, wherein the variable wall thickness at the first internal shoulder is about 0.75 inches and the variable wall thickness at the first end surface is about 0.6 inches.

14. The wing nut of claim 8, wherein the internal threaded connection extends from the first end surface and towards the first internal shoulder.

15. The wing nut of claim 8, further comprising:
   a second internal shoulder formed by the interior surface of the body and defining yet another portion of the passage.

16. The wing nut of claim 15, wherein the second internal shoulder is axially positioned between the internal threaded connection and the first internal shoulder.

17. The wing nut of claim 1, wherein the body has a variable wall thickness defined between the interior surface of the body and the exterior surface of the body.

18. The wing nut of claim 1, wherein the first lug of the plurality of lugs extends along substantially the entirety of the axial length of the body.

19. The wing nut of claim 1, wherein the full-root radius is at least one of 0.05 inches, 0.053 inches, 0.06 inches, or 0.07 inches.

20. A wing nut for an oilfield equipment hammer union, the wing nut comprising:
   a body having an axial length defined between first and second end surfaces, the body having an exterior surface extending between the first and second end surfaces;
   a passage axially extending through the body from the first end surface to the second end surface, wherein the passage defines an interior surface of the body;
   an internal threaded connection formed by the interior surface of the body and defining a portion of the passage, wherein the internal threaded connection includes a full-root radius;
   a plurality of circumferentially-spaced lugs extending radially from the exterior surface of the body,
      wherein a first lug of the plurality of lugs has radially-extending side walls configured to receive forces used to tighten and loosen the wing nut; and
   a plurality of retainer segments,
      wherein the wing nut is configured to be concentrically disposed about the plurality of retainer segments and each of a female sub and a male sub of the hammer union, to couple the female sub to the male sub, while the interior surface of the body of the wing nut is configured to be spaced radially from the male sub, and
      wherein the plurality of retainer segments are configured to be concentrically disposed about the male sub and radially positioned between the male sub and the wing nut.

* * * * *